United States Patent [19]

Workman

[11] 4,179,709

[45] Dec. 18, 1979

[54] VIDEO INFORMATION BANDWIDTH COMPRESSION

[75] Inventor: Dennis L. Workman, Morgan Hill, Calif.

[73] Assignee: Bell & Howell Company, Chicago, Ill.

[21] Appl. No.: 868,236

[22] Filed: Jan. 10, 1978

[51] Int. Cl.² .............................................. H04M 7/12
[52] U.S. Cl. ..................................... 358/133; 358/260; 358/138; 340/347 DD
[58] Field of Search .............. 358/133, 135, 136, 138, 358/263, 260; 360/11; 340/347 DD

[56] References Cited

U.S. PATENT DOCUMENTS

| | | | |
|---|---|---|---|
| 3,470,313 | 9/1969 | Bockwoldt | 358/133 |
| 3,976,826 | 8/1976 | Fullton, Jr. | 358/133 |
| 3,984,626 | 10/1976 | Moumts et al. | 358/133 |
| 4,013,828 | 3/1977 | Judice | 358/133 |
| 4,037,248 | 7/1977 | Iijima et al. | 358/13 |

OTHER PUBLICATIONS

Fukinuki, "Intraframe Image Coding by Cascaded Hadamard Transforms", 3-73, I.E.E.E. vol.-Com-21, No. 3.

Huang, "Picture Bandwidth Compression" (New York, Gordon and Breach, Science Publishers, 1972), pp. 515-554.

Henri Tschen, "Television Image Coding by Means of Hadamard and Haar Orthogonal Transformations.

*Primary Examiner*—Howard W. Britton
*Assistant Examiner*—Edward L. Coles
*Attorney, Agent, or Firm*—Benoit Law Corporation

[57] ABSTRACT

Methods and apparatus for video information bandwidth compression arrange the video information in image fields and subfields and provide for the subfields a system of coefficients having a first coefficient indicative of average subfield luminance as to any given subfield and including a selected number of further coefficients indicative of spatial content of the particular subfield. The first and further coefficients are updated with the first coefficient being updated for each subfield as to each utilized field and the further coefficients being updated less frequently than the first coefficient. The subject invention is also applicable to bandwidth compression of recurring information other than video signals.

130 Claims, 16 Drawing Figures

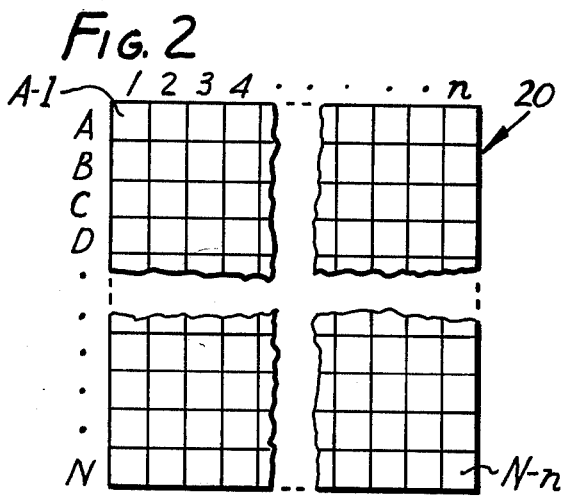
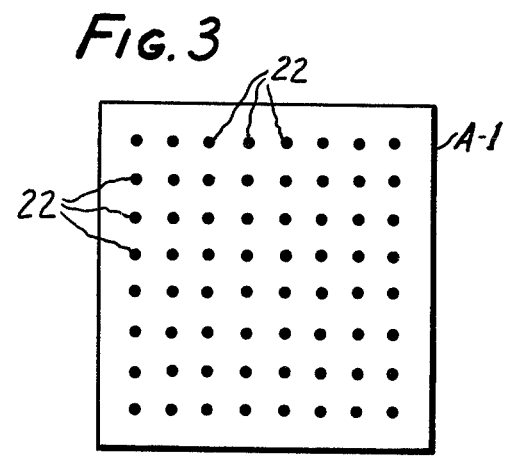
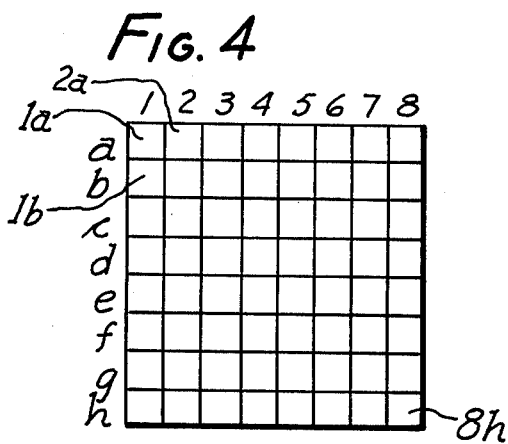
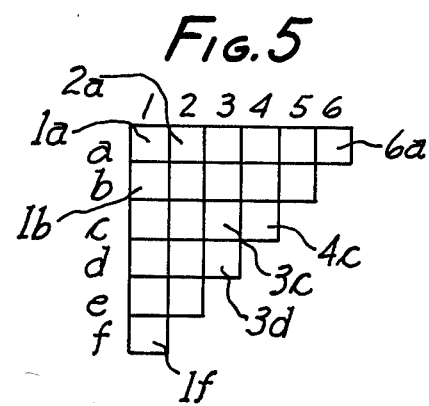
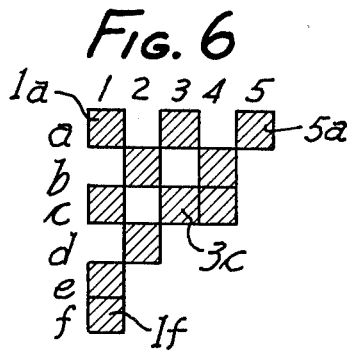
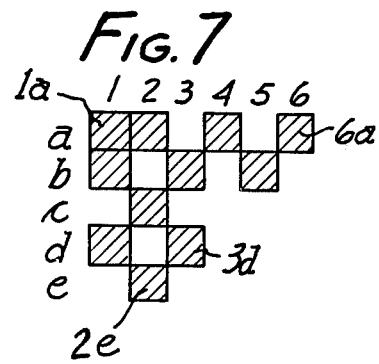

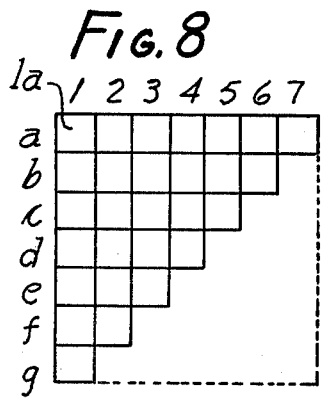
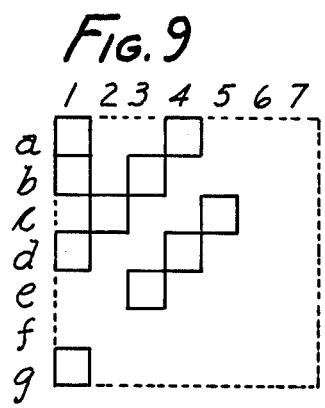
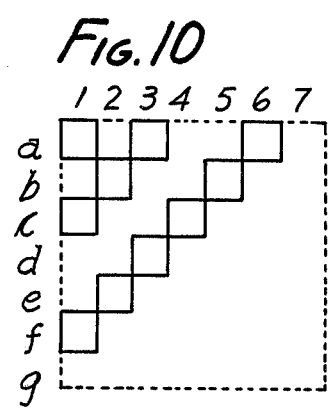
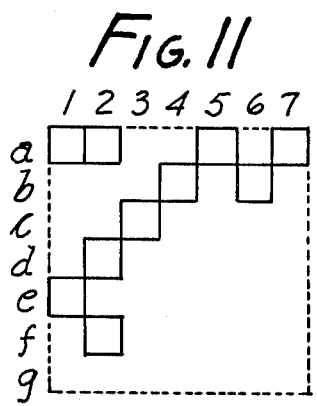
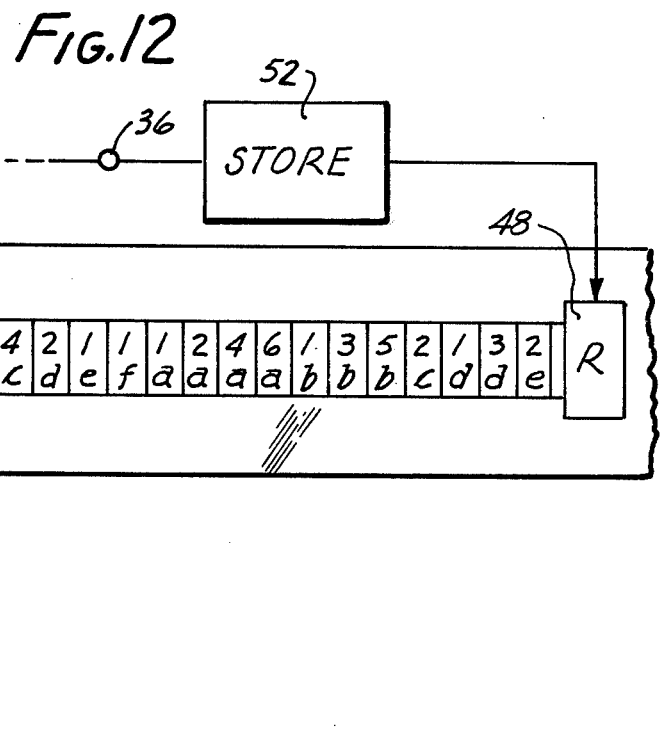

VIDEO INFORMATION BANDWIDTH COMPRESSION

BACKGROUND OF THE INVENTION

1. Field of the Invention

The subject invention relates to the recording, playback, transmission and other processing of video and other recurring information and, more specifically, to methods and apparatus for compressing the bandwidth of video and other recurring information, and particularly to picture bandwidth compression.

2. Prior Art Statement

As a general statement, information transfer systems may be broadly described in terms of five components: an information source, an information sink, an information transfer channel, and an encoder and a decoder which match the source and the sink, respectively, to the transfer channel. In the case of a transmission system, the transfer channel is a channel through which the information is transmitted. If the information transfer is effected through recording and subsequent playback, the transfer channel includes information recording and playback equipment.

In the special case of cinematography, the information transfer channel includes a motion picture film, and the information sink includes the human observer as the ultimate receiver of the motion picture. As to the technical aspect of cinematography, a chief goal is to impart to the human observer the illusion of motion in the presented picture, ideally in a flicker-free display. In this respect it has been found that the requisite information update generally is significantly higher for the achievement of a flicker-free display than it is for the impartation of the desired illusion of motion.

In recognition of this psychophysical phenomenon, motion pictures are typically displayed at a rate, such as twenty-four frames per second, which is satisfactory for a creation of the desired illusion of motion, but which would be inadequate to avoid flicker in the presented pictures. However, flicker is practically avoided through the use of an agency, such as a mechanical chopper, which breaks each displayed frame into several distinct flashes of luminance for a virtual frame rate equal to the number of flashes per frame multiplied by the number of frames per second. For instance, if the motion picture film is advanced at twenty-four frames per second, then a mechanical chopper may break each frame into three distinct flashes of luminance for a virtual frame rate of seventy-two frames per second, thereby avoiding flicker for practical purposes without incurring the high expense and inconvenience of a film speed of seventy-two frames per second.

Some of the efforts to reduce the requisite bandwidth of video signal transmissions are described in the book PICTURE BANDWIDTH COMPRESSION, edited by Thomas S. Huang and Ohl J. Tretiak (Gordon and Breach, Science Publishers, 1972). Page 11 of that book designates the interlace of TV lines as epitomizing the contribution of visual psychophysics to engineering, and introduces a number of articles dealing with flicker effects and other phenomena concerning the human observer.

In this respect, it is well known that commercial television operates at a rate of approximately sixty fields per second in the NTSC system and at fifty fields per second in the PAL and SECAM systems. These field rates were the result of efforts to provide a flicker-free display in the context of a supply power line frequency of 60 Hz and 50 Hz, respectively.

Most video bandwidth compression approaches have been inspired by the recognition, as in the above mentioned case of cinematography, that the field rate or update requisite to a flicker-free display produces redundancy as far as the generation of an illusion of motion in scenes displayed to the human observer is concerned.

In this respect, reference may be had to U.S. Pat. No. 3,944,728, by Leonard A. Ferrari, issued Mar. 16, 1976 to the subject assignor, and including a description of an advanced skip field technique in a recording and playback environment. The requisite recording channel bandwidth is kept low by recording at a reduced speed only as many fields per second as required for a preservation of the illusion of motion in the resulting image display. Flicker is avoided, on the other hand, by a repeated reproduction of recorded fields at increased recording medium speed.

Another approach, known as inter-frame encoding and described in Part 6 of the above mentioned PICTURE BANDWIDTH COMPRESSION book, pp. 623 et seq., proposes to reduce bandwidth by a frame-to-frame correlation technique which typically confines the updating of information to the occurrence of picture element changes among succeeding fields or frames. A major drawback of such systems, which so far has prevented their use on a commercial scale, is their need for a large storage facility coupled with extensive hardware for a detection and evaluation of interframe picture element changes.

In this respect, reference may be had to the picture point interlace method illustrated on page 634 of the above mentioned PICTURE BANDWIDTH COMPRESSION book, wherein different picture elements are processed in different passes. In particular, that frame-correction coding system transmits motion sequences at lower data rates than used in standard practice by correcting a fixed fraction of the picture sample points during each frame transmission.

In the intra-frame encoding field, described in Part 5 of the above mentioned PICTURE BANDWIDTH COMPRESSION book, the application of Fourier-Hadamard and other transformation techniques to bandwidth compression has been proposed as may be seen from pp. 515 to 573 of that book. Though this approach appeared promising, its commercial application has been faltering.

In this respect, U.S. Pat. No. 3,976,826 by J. M. Fullton, issued Aug. 24, 1976, appears to evince a recognition of the importance of different orders of coefficients in a Hadamard or Fourier transformation context, when proposing that the highest order coefficient relating to basis vector H(0), which gives the amplitude (brightness) of the overall subpicture, might always be selected, and that then the four largest remaining coefficients might be chosen. However, the text and disclosure of that patent are deficient of a useful coefficient selection strategy.

The subsequent U.S. Pat. No. 4,037,248, by Iijima et al, issued July 19, 1977, in effect rejects the orthogonal or Hadamard transformation technique in favor of a special sampling method.

SUMMARY OF THE INVENTION

It is a general object of this invention to overcome the above mentioned disadvantages.

It is a related object of this invention to provide improved methods and apparatus for facilitating the transmission, recording and other transfer of video signals or other recurring information.

It is a germane object of this invention to provide improved methods and apparatus for compressing the bandwidth of video and other recurring information.

It is a related object of the invention to provide improved methods and apparatus for compressing the bandwidth of video signals including video information and synchronization information.

It is also an object of this invention to provide improved methods and apparatus for compressed bandwidth video information processing.

It is a related object of this invention to provide improved coding and decoding techniques in the context of information transmission, recording and other transfer.

It is a related object of this invention to provide improved methods and apparatus employing signal transformation to the coding of information.

Other objects will become apparent in the further course of this disclosure.

From a first aspect thereof, the subject invention resides in a method of video information bandwidth compression, comprising in combination the steps of arranging said video information in image fields and subfields, providing for said subfields a system of coefficients having a first coefficient indicative of average subfield luminance as to any given subfield and including a selected number of further coefficients indicative of spatial content of the particular subfield, and updating said first and further coefficients, with said first coefficient being updated for each subfield as to each utilized field and said further coefficients being updated less frequently than said first coefficient.

From another aspect thereof, the subject invention resides in a method of video information bandwidth compression, comprising in combination the steps of arranging said video information in image fields and subfields, providing for said subfields a system of coefficients having a first coefficient indicative of average subfield luminance as to any given subfield and including further coefficients indicative of spatial content of the particular subfield and being of unequal significance, selecting from said further coefficients a number of coefficients having at least a predetermined significance and deleting the remainder of said further coefficients, and updating said first and selected further coefficients, with said first coefficient being updated for each subfield as to each utilized field and said selected further coefficients being updated less frequently than said first coefficient.

From another aspect thereof, the subject invention resides in a method of compressing the bandwidth of a video signal including video information and synchronization information for said video information, comprising in combination the steps of separating said synchronization information from said video information, arranging said video information in image fields and subfields, providing for said subfields a system of coefficients having a first coefficient indicative of average subfield luminance as to any given subfield and including a selected number of further coefficients indicative of spatial content of the particular subfield, updating said first and further coefficients, with said first coefficient being updated for each subfield as to each utilized field and said further coefficients being updated less frequently than said first coefficient, and combining said separated synchronization information and updated first and further coefficients to a reduced bandwidth video signal.

From another aspect thereof, the subject invention resides in a method of compressing the bandwidth of a video signal including video information and synchronization information for said video information, comprising in combination the steps of separating said synchronization information from said video information, arranging said video information in image fields and subfields, providing for said subfields a system of coefficients having a first coefficient indicative of average subfield luminance as to any given subfield and including further coefficients indicative of spatial content of the particular subfield and being of unequal significance, selecting from said further coefficients a number of coefficients having at least a predetermined significance and deleting the remainder of said further coefficients, updating said first and selected further coefficients, with said first coefficient being updated for each subfield as to each utilized field and said selected further coefficients being updated less frequently than said first coefficient, and combining said separated synchronization information and updated first and selected further coefficients to a reduced bandwidth video signal.

From another aspect thereof, the subject invention resides in a method of compressed bandwidth video information processing, comprising in combination the steps of arranging said video information in image fields and subfields, providing for said subfields a system of coefficients having a first coefficient indicative of average subfield luminance as to any given subfield and including a selected number of further coefficients indicative of spatial content of the particular subfield, updating said first and further coefficients, with said first coefficient being updated for each subfield as to each utilized field and said further coefficients being updated less frequently than said first coefficient, transferring said updated first and further coefficients through a data channel, and partially reconstructing said video information with said transferred updated first and further coefficients.

From another aspect thereof, the subject invention resides in a method of compressed bandwidth video information processing, comprising in combination the steps of arranging said video information in image fields and subfields, providing for said subfields a system of coefficients having a first coefficient indicative of average subfield luminance as to any given subfield and including further coefficients indicative of spatial content of the particular subfield and being of unequal significance, selecting from said further coefficients a number of coefficients having at least a predetermined significance and deleting the remainder of said further coefficients, updating said first and selected further coefficients, with said first coefficient being updated for each subfield as to each utilized field and said selected further coefficients being updated less frequently than said first coefficient, transferring said updated first and selected further coefficients through a data channel, and partially reconstructing said video information with said transferred updated first and selected further coefficients.

From another aspect thereof, the subject invention resides in a method of compressed bandwidth processing of a video signal including video information and synchronization information for said video information, comprising in combination the steps of separating said synchronization information from said video information, arranging said video information in image fields and subfields, providing for said subfields a system of coefficients having a first coefficient indicative of average subfield luminance as to any given subfield and including a selected number of further coefficients indicative of spatial content of the particular subfield, updating said first and further coefficients, with said first coefficient being updated for each subfield as to each utilized field and said further coefficients being updated less frequently than said first coefficient, combining said separated synchronization information and updated first and further coefficients to a reduced bandwidth video signal, transferring said reduced bandwidth video signal through a data channel, and partially reconstructing said video information with said transferred reduced bandwidth video signal.

From another aspect thereof, the subject invention resides in a method of compressed bandwidth processing of a video signal including video information and synchronization information for said video information, comprising in combination the steps of separating said synchronization information from said video information, arranging said video information in image fields and subfields, providing for said subfields a system of coefficients having a first coefficient indicative of average subfield luminance as to any given subfield and including further coefficients indicative of spatial content of the particular subfield and being of unequal significance, selecting from said further coefficients a number of coefficients having at least a predetermined significance and deleting the remainder of said further coefficients, updating said first and selected further coefficients, with said first coefficient being updated for each subfield as to each utilized field and said selected further coefficients being updated less frequently than said first coefficient, combining said separated synchronization information and updated first and selected further coefficients to a reduced bandwidth video signal, transferring said reduced bandwidth video signal through a data channel, and partially reconstructing said video information with said transferred reduced bandwidth video signal.

From another aspect thereof, the subject invention resides in a method of bandwidth compressing recurring information, comprising in combination the steps of arranging said recurring information in two-dimensional arrays of information elements, providing for said arrays a system of coefficients having for each array a first coefficient indicative of an average intensity of information elements in the particular array and including a selected number of further coefficients indicative of spatial content in terms of the information elements of the particular array, and updating said first and further coefficients, with said first coefficient being updated more frequently than said further coefficients.

From another aspect thereof, the subject invention resides in video information bandwidth compression apparatus and, more specifically, resides in the improvement comprising, in combination, means for arranging said video information in image fields and subfields, means operatively associated with said arranging means for providing for said subfields a system of coefficients having a first coefficient indicative of average subfield luminance as to any given subfield and including a selected number of further coefficients indicative of spatial content of the particular subfield, and means connected to said coefficients providing means for updating said first and further coefficients, said updating means including means for updating said first coefficient for each subfield as to each utilized field and for updating said further coefficients less frequently than said first coefficient.

From another aspect thereof, the subject invention resides in video information bandwidth compression apparatus and, more specifically, resides in the improvement comprising, in combination, means for arranging said video information in image fields and subfields, means operatively associated with said arranging means for providing for said subfields a system of coefficients having a first coefficient indicative of average subfield luminance as to any given subfield and including further coefficients indicative of spatial content of the particular subfield and being of unequal significance, means connected to said coefficients providing means for selecting from said further coefficients a number of coefficients having at least a predetermined significance and for deleting the remainder of said further coefficients, and means connected to either of said coefficients providing means and said selecting means for updating said first and selected further coefficients, said updating means including means for updating said first coefficient for each subfield as to each utilized field and for updating said selected further coefficients less frequently than said first coefficient.

From another aspect thereof, the subject invention resides in apparatus for compressing the bandwidth of a video signal including video information and synchronization information for said video information and, more specifically, resides in the improvement comprising, in combination, means for separating said synchronization information from said video information, means for arranging said video information in image fields and subfields, means operatively associated with said separating means and arranging means for providing for said subfields a system of coefficients having a first coefficient indicative of average subfield luminance as to any given subfield and including a selected number of further coefficients indicative of spatial content of the particular subfield, means connected to said coefficients providing means for updating said first and further coefficients, said updating means including means for updating said first coefficient for each subfield as to each utilized field and for updating said further coefficients less frequently than said first coefficient, and means connected to said updating means and to said separating means for combining said separated synchronization information and update first and further coefficients to a reduced bandwidth video signal.

From another aspect thereof, the subject invention resides in apparatus for compressing the bandwidth of a video signal including video information and synchronization information for said video information and, more specifically, resides in the improvement comprising, in combination, means for separating said synchronization information from said video information, means for arranging said video information in image fields and subfields, means operatively associated with said separating means and arranging means for providing for said subfields a system of coefficients having a first coefficient indicative of average subfield luminance as to any given subfield and including further coefficients indicative of spatial content of the particular subfield and being of unequal significance, means connected to said coefficients providing means for selecting from said further coefficients a number of coefficients having at least a predetermined significance and for deleting the remainder of said further coefficients, means connected to either of said coefficients providing means and said selecting means for updating said first and selected further coefficients, said updating means including means for updating said first coefficient for each subfield as to each utilized field and for updating said selected further coefficients less frequently than said first coefficient, and means connected to said updating means and to said separating means for combining said separated synchronization information and updated first and selected further coefficients to a reduced bandwidth video signal.

From another aspect thereof, the subject invention resides in compressed bandwidth video information processing apparatus and, more specifically, resides in the improvement comprising, in combination, means for arranging said video information in image fields and subfields, means operatively associated with said arranging means for providing for said subfields a system of coefficients having a first coefficient indicative of average subfield luminance as to any given subfield and including a selected number of further coefficients indicative of spatial content of the particular subfield, means connected to said coefficient providing means for updating said first and further coefficients, said updating means including means for updating said first coefficient for each subfield as to each utilized field and for updating said further coefficients less frequently than said first coefficient, means including a data channel connected to said updating means for transferring said updated first and further coefficients, and means connected to said means including a data channel for partially reconstructing said video information from said transferred updated first and further coefficients.

From another aspect thereof, the subject invention resides in compressed bandwidth video information processing apparatus and, more specifically, resides in the improvement comprising, in combination, means for arranging said video information in image fields and subfields, means operatively associated with said arranging means for providing for said subfields a system of coefficients having a first coefficient indicative of average subfield luminance as to any given subfield and including further coefficients indicative of spatial content of the particular subfield and being of unequal significance, means connected to said coefficients providing means for selecting from said further coefficients a number of coefficients having at least a predetermined significance and for deleting the remainder of said further coefficients, means connected to either of said coefficients providing means and said selecting means for updating said first and selected further coefficients, said updating means including means for updating said first coefficient for each subfield as to each utilized field and for updating said selected further coefficients less frequently than said first coefficient, means including a data channel connected to said updating means for transferring said updated first and selected further coefficients, and means connected to said means including a data channel for partially reconstructing said video information from said transferred updated first and selected further coefficients.

From another aspect thereof, the subject invention resides in apparatus for compressed bandwidth processing of a video signal including video information and synchronization information for said video information and, more specifically, resides in the improvement comprising, in combination, means for separating said synchronization information from said video information, means for arranging said video information in image fields and subfields, means operatively associated with said separating means and arranging means for providing for said subfields a system of coefficients having a first coefficient indicative of average subfield luminance as to any given subfield and including a selected number of further coefficients indicative of spatial content of the particular subfield, means connected to said coefficients providing means for updating said first and further coefficients, said updating means including means for updating said first coefficient for each subfield as to each utilized field and for updating said further coefficients less frequently than said first coefficient, means connected to said updating means and to said separating means for combining said separated synchronization information and updated first and further coefficients to a reduced bandwidth video signal, means including a data channel connected to said combining means for transferring said reduced bandwidth video signal, and means connected to said means including a data channel for partially reconstructing said video information from said transferred reduced bandwidth video signal.

From another aspect thereof, the subject invention resides in apparatus for compressed bandwidth processing of a video signal including video information and synchronization information for said video information and, more specifically, resides in the improvement comprising, in combination, means for separating said synchronization information from said video information, means for arranging said video information in image fields and subfields, means operatively associated with said separating means and arranging means for providing for said subfields a system of coefficients having a first coefficient indicative of average subfield luminance as to any given subfield and including further coefficients indicative of spatial content of the particular subfield and being of unequal significance, means connected to said coefficients providing means for selecting from said further coefficients a number of coefficients having at least a predetermined significance and for deleting the remainder of said further coefficients, means connected to either of said coefficients providing means and said selecting means for updating said first and selected further coefficients, said updating means including means for updating said first coefficient for each subfield as to each utilized field and for updating said selected further coefficients less frequently than said first coefficient, means connected to said updating means and to said separating means for combining said separated synchronization information and updated first and selected further coefficients to a reduced bandwidth video signal, means including a data channel connected to said combining means for transferring said reduced bandwidth video signal, and means connected to said means including a data channel for partially reconstructing said video information from said transferred reduced bandwidth video signal.

From another aspect thereof, the subject invention resides in apparatus for compressing the bandwidth of recurring information and, more specifically, resides in the improvement comprising, in combination, means for arranging said recurring information in two-dimensional arrays of information elements, means operatively associated with said arranging means for providing for said arrays a system of coefficients having for each array a first coefficient indicative of an average intesnity of information elements in the particular array and including at least potentially a selected number of further coefficients indicative of spatial content in terms of the information elements of the particular array, and means connected to said coefficients providing means for updating said first and further coefficients, said updating means including means for updating said first coefficient more frequently than said first coefficient.

BRIEF DESCRIPTION OF THE DRAWINGS

The invention and its various aspects and objects will become more readily apparent from the following detailed description of preferred embodiments thereof, illustrated by way of example in the accompanying drawings, in which like reference numerals designate like or functionally equivalent parts, and in which:

FIGS. 2 to 7 are related diagrams illustrating video information encoding methods in accordance with a preferred embodiment of the subject invention, as may be practiced in the system of FIG. 1;

FIGS. 8 to 11 are related diagrams illustrating a video information encoding method in accordance with a further preferred embodiment of the subject invention, as may alternatively be practiced in the system of FIG. 1;

FIG. 12 is a somewhat diagrammatic illustration of a compressed bandwidth information recording method and apparatus in accordance with a preferred embodiment of the subject invention, as may be used in the system of FIG. 1;

DESCRIPTION OF PREFERRED EMBODIMENTS

Figure 1:
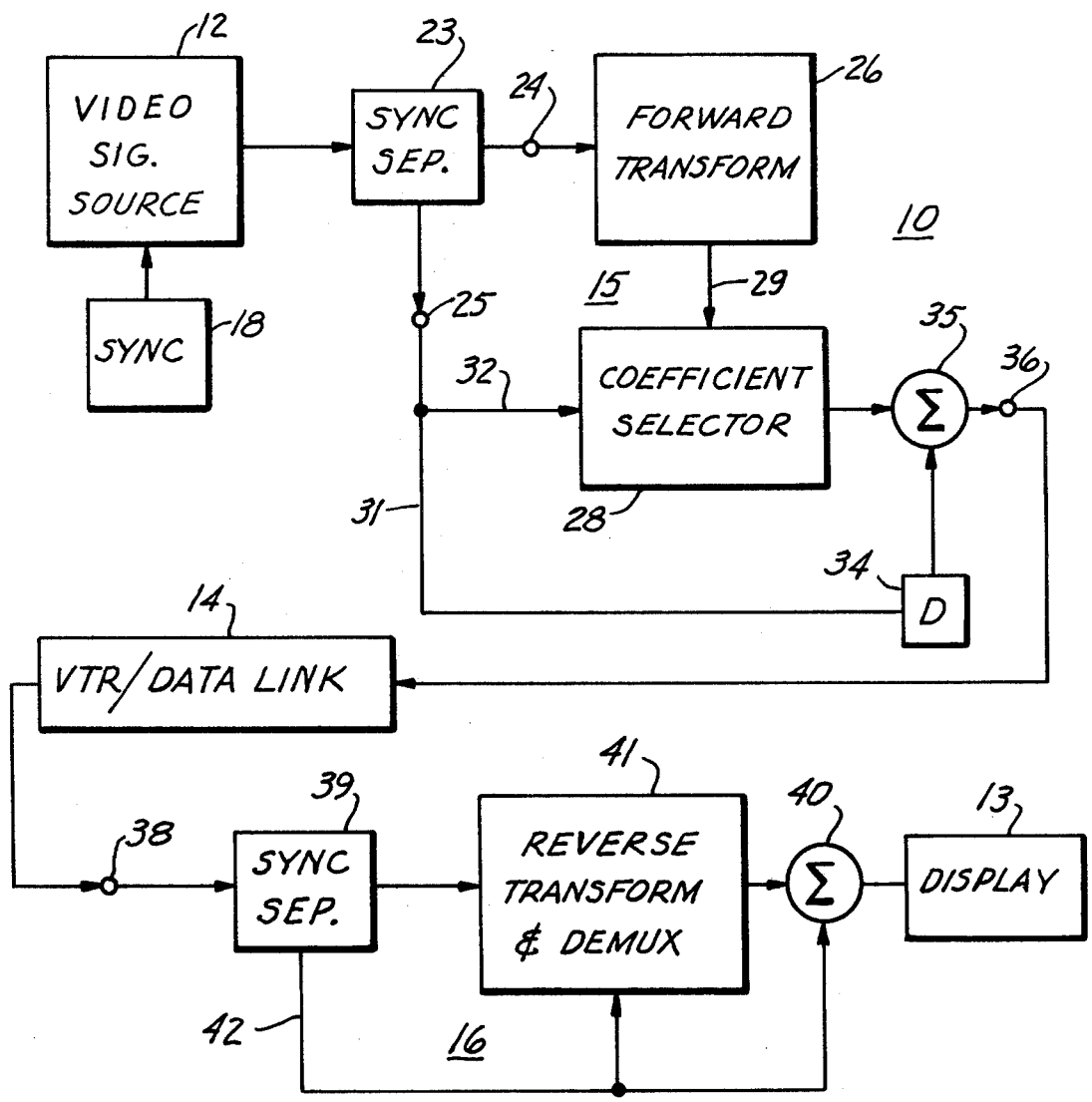
FIG. 1 is a block diagram of an information transfer system in accordance with a preferred embodiment of the subject invention.

In terms of the above mentioned general statement, the information transfer system 10 shown in FIG. 1 comprises an information source 12, an information sink 13, an information transfer channel 14, an encoder 15 and a decoder 16 which match the source 12 and the sink 13, respectively, to the transfer channel 14.

In the illustrated preferred embodiment of FIG. 1, the information source 12 is a video signal source comprising, for instance, a video camera, an off-the-air, cable or closed-circuit television receiver, video tape recorder, video disk playback machine, or other source of pictorial or pictorially presented information.

As shown in FIG. 1, the source 12 includes or has associated therewith a source of synchronization information 18 for synchronizing the video information provided by the source 12. For instance, the component 18 may be a sync signal source enabling the video source 12 to arrange the generated video information in image fields and subfields, with or without field interlace, in accordance with conventional practice.

In this respect, FIG. 2 illustrates a video image field 20 composed of subpictures or subfields A-1 through N-n. The showing of FIG. 2 has been foreshortened in two dimensions, since a video field or picture typically would be subdivided into a much larger multitude of subfields than as shown in FIG. 2. Generally speaking, the subfields are arranged in columns 1 through n and rows A through N. The number of columns n is typically larger than the number of rows N if the field 20 is wider than high, as is typically the case with commercial and most closed-circuit video images.

The designation or numbering of the subfields proceeds in terms of the row letter and hyphenated column number, such as A-1 for the first subfield and N-n for the last subfield, relatively speaking.

By way of example, FIG. 3 shows any subfield, such as the first subfield A-1 of the field 20, as comprising eight by eight or sixty-four picture elements 22. In practice, the picture elements 22 are generally referred to as "pixels" or "pels".

In terms of FIGS. 2 and 3, the video signal source 12 shown in FIG. 1 with synchronization equipment 18 arranges the video information in image fields 20 and subfields A-1 through N-n composed of picture elements or pels 22.

The video information provided by the source 12 is applied to the encoder 15. In the illustrated preferred embodiment, a sync separator 23 separates the synchronization information from the video information, applying the video information to a terminal 24 and the synchronization information to a terminal 25.

The video information proceeds via terminal 24 to a forward transformation circuit 26 of the encoder 15.

The forward transformation circuit 26 provides for each subfield A-1 to N-n a system of coefficients having a first coefficient indicative of average subfield luminance (amplitude, brightness, intensity) as to the given subfield, and including a selected number of further coefficients indicative of spatial content of the particular subfield. By way of example, and as shown with the aid of FIG. 4 relative to FIG. 3 as to one subfield, the transform circuit provides a system of coefficients shown as arranged in columns 1 through 8 and rows a through h, and having a first coefficient 1a indicative of average subfield luminance as to the particular subfield, and including further coefficients 2a, 1b through 8h indicative of spatial content of the particular subfield.

In terms of FIGS. 3 and 4, the transform circuit 26 shown in FIG. 1 transforms picture elements 22 of each subfield being utilized, such as the subfield A-1, into a first transform coefficient signal represented by the square 1a and into further transform coefficient signal represented by squares 2a, 1b et seq. The first transform coefficient signal 1a is indicative of the average luminance of the pels 22 of the subfield A-1, while the further transform coefficient signals 2a, 1b et seq. are indicative of spatial content of the subfield A-1. Reference may in this respect be had to the above mentioned U.S. Pat. No. 3,976,826 by Fullton, which is herewith incorporated by reference herein.

The transformation used at 26 in the encoder 15 is thus of a type which (a) is reversible to restore the transformed pictorial information after transmission, recording/playback or other transfer thereof to a degree satisfactory for a given purpose, (b) has a component or yields a coefficient which represents or is indicative of average luminance within the individual subfield to which that component or coefficient pertains, and (c) enables or provides for a bandwidth compression of the transferred pictorial information. In accordance with a preferred embodiment, the transformation technique employed at 26 in the encoder 15 should, in addition to the average luminance coefficient, yield coefficients having different degrees of significance, whereby coefficients having at least a predetermined significance may be selected for the information transfer function in conjunction with the average luminance coefficient, and whereby none-selected coefficients having a lesser significance may be deleted for bandwidth economy.

In this respect, orthogonal transforms have a direct-current component representing average subfield luminance. By way of example, Fourier and Hadamard transforms are types of orthogonal transforms employed in reduced bandwidth picture transmission or transfer. Other known transforms for this purpose are cosine square transforms.

By way of example and not by way of limitation, the Hadamard transform is presently preferred for its advantageous features, including the property of having an inverse which yields the unit matrix, and bases vectors of typical element values of $+1$ and $-1$. Reference may in this respect be had to above mentioned PICTURE BANDWIDTH COMPRESSION book, and particularly to pages 515 to 573 thereof.

In addition to the above mentioned U.S. Pat. No. 3,976,826, reference may, in this respect, also be had to the above mentioned U.S. Pat. No. 3,984,626, by Frank William Mounts et al, which is herewith incorporated by reference herein.

FIG. 5 diagrammatically shows the coefficients which, for a given data transfer are sufficient to permit satisfactory reconstruction of the transferred information. The coefficients apparent from FIG. 4, but not shown in FIG. 5, are deleted prior to the transfer of coefficients through the data channel.

In this respect, it should be understood that the expressions "selected" and "deleted" with respect to the transform coefficients are herein used in a broad sense. For instance, all the coefficients represented in FIG. 4 may actually be generated in the component 26 of the encoder 15, and the coefficients shown in FIG. 5 may be selected, while the coefficients not shown in FIG. 5 may be deleted. On the other hand, only the coefficients shown in FIG. 5 may in the first place by generated. In that case, "selected" refers to the function or design of the hardware or circuitry which generates only the coefficients shown in FIG. 5, while "deleted" in that instance is equivalent to "not generated". In functional terms, the coefficients shown in FIG. 5 in addition to the average luminosity coefficient $1a$, may comprise coefficients indicative of spatial content at a frequency lower than the frequency of coefficients which do not significantly contribute to a display of the transferred video information in a given situation.

Expressed broadly, FIG. 5 represents the result of a deletion or non-generation of high frequency components which would not significantly contribute to the reconstruction of the transferred pictorial information.

According to FIG. 1, the encoder 15 also includes a coefficient selector 28 connected to the forward transformation circuitry 26 by a line 29. In principle, the coefficient selector 28 may effect the selection of significant coefficients illustrated in the diagram of FIG. 5. However, the main function of the coefficient selector 28 is the selection of coefficients in the manner illustrated by way of example in FIGS. 6 and 7 relative to FIG. 4, or FIGS. 9, 10 and 11 relative to FIG. 8.

In this respect, the first coefficient $1a$ and the selected further coefficients shown, for instance, in FIG. 5, are all updated, but the first coefficient $1a$ is updated for each subfield A-1, etc., as to each utilized field 20 while the selected further coefficients $2a$, $1b$, etc., are updated less frequently than the first coefficient $1a$. For instance, in the case of field-interlaced video information, all the first and further coefficients shown in FIG. 5 would be updated as to each subfield for each frame composed of two interlaced fields. However, only the first coefficient $1a$ is updated as to each subfield for each of the two fields, and only one-half of the selected further coefficients of each subfield is updated for only one of the two fields, while the remaining half of the selected further coefficients is updated as to each subfield for the other field of the particular frame.

In principle, the first and second halves of the selectively updated further coefficients could be arbitrarily chosen. It is, however, generally preferable to adopt a strategy in the selective updating of the further coefficients.

For instance, FIGS. 6 and 7 show complementary checkerboard type patterns illustrating the updating of further coefficients during one field (FIG. 6) and the complementary updating of the remaining selected further coefficients during the other field (FIG. 7) of a field-interlaced frame. Broadly speaking, the strategy illustrated in FIGS. 6 and 7 substantially is to update alternate coefficients as to a first field and the selected further coefficients for a second field, with the first coefficient $1a$ being updated for each field.

The updating technique and strategy illustrated in FIGS. 6 and 7 permit a fifty percent bandwidth reduction for video information transmission, recording/playback or other transfer, relative to the bandwidth necessary for a transfer of all selected coefficients (FIG. 5) each time. In practice, the bandwidth compression may be somewhat less than fifty percent inasmuch as the first coefficient is updated for each subfield as to each field being utilized. With respect to FIG. 4, the bandwidth compression illustrated with the aid of FIGS. 6 and 7 is, however, higher than fifty percent, since high frequency components have already been eliminated as shown in FIG. 5, prior to the updating process in the coefficient selector 28.

Achievement of a yet higher bandwidth compression is illustrated in FIGS. 9 to 11 relative to FIG. 8.

In particular, FIG. 8 shows the first coefficient and selected further coefficients remaining for a given subfield after elimination of certain less significant high frequency components or coefficients. According to the strategy illustrated in FIGS. 9 to 11, the updating of the selected further coefficients is spread over three image fields, with the first coefficient $1a$ being updated for each subfield as to each of the three image fields, while only one-third of the further coefficients are updated during any image field.

In particular, the updating of further coefficients is rotated, so to speak, so that the further coefficients updated for any subfield during each set of three image fields are different from the further coefficients updated for any corresponding subfield among the same set of three image fields. This is illustrated in FIGS. 9 to 11, where the first coefficient 1a occurs for each of the three subfields of FIGS. 9 to 11, while no further coefficient appears more than once in any subfield of the set of three subfields shown in FIGS. 9 to 11.

The technique shown in FIGS. 9 to 11, permits a bandwidth compression to almost one-third of the bandwidth that would be required if all the coefficients shown in FIG. 8 were continuously updated. Of course, the bandwidth compression thus attainable is yet higher relative to the original or archetypal subfield shown in FIG. 4, since FIG. 8 already embodies an elimination of less significant high frequency components.

Reverting briefly to FIGS. 6 and 7, it will be noted that the coefficient selection technique illustrated therein spreads the updating of the selected further coefficients over two image fields (FIGS. 6 and 7) and updates only one-half of the further coefficients during any image field (FIG. 6 or FIG. 7). Also, the further coefficients updated for any subfield during each set of two image fields are different from the further coefficients updated for the corresponding subfield during the same set of two image fields. The latter feature manifests itself in the embodiment of FIGS. 6 and 7, and also in the embodiment of FIGS. 9 to 11, by the fact that only the first coefficient 1a, which represents average subfield luminance, occurs in each of the FIGS. 6, 7, 9, 10 and 11, while none of the further coefficients occurring in either of the subfields of FIGS. 6 and 7 occurs again in the other of these two subfields. Similarly, none of the further coefficients occurring in any of the subfields of FIGS. 9 to 11 appears in any other of these subfields.

In general terms, the updating of further coefficients (i.e. selected coefficients other than the first coefficient 1a) is spread over n image fields, with n being an integer greater than one, and only 1/n further coefficients is updated during any image field. The further coefficients updated for any subfield during each set of n image fields are different from the further coefficients updated for any corresponding subfield during the same set of n image fields.

On the other hand, the number of updated coefficients is at least approximately equal for all utilized subfields.

It should be noted in this respect that the designations 1a, 2a, 1b, 2b, ... 8h employed in FIGS. 6, 7, 9, 10 and 11 denote relative position rather than identity of coefficients. For instance, the coefficient 1a in FIG. 7 is different from the coefficient 1a in FIG. 6. More specifically, the first coefficient 1a of FIG. 6 represents the average luminance of the subfield pertaining to FIG. 6, while the first coefficient 1a of FIG. 7 represents the average luminance of the subfield pertaining to FIG. 7. Since the subfield pertaining to FIG. 6 may, for instance, be part of a first field, and the subfield pertaining to FIG. 7 part of a second field, of a field-interlaced frame, the average luminance of the subfield pertaining to FIG. 6 may, of course, be different from the average luminance of the subfield pertaining to FIG. 7. Accordingly, the first coefficients designated 1a in FIGS. 6 and 7 may well have different values.

The same principle applies to the further coefficients. For instance, if the coefficient 3c shown in FIG. 6 is the same as the coefficient 3c in FIG. 5, that is if the showings of FIGS. 5 and 6 apply to the same subfield not only in space but also in time, then the coefficient 3d shown in FIG. 7 cannot be the same as the coefficient 3d shown in FIG. 5, since FIGS. 5 and 7 then pertain to different subfields at least in terms of time sequence, though those two subfields may sequentially appear at the same location on the video screen.

To distinguish in FIGS. 6 and 7 between present coefficients and omitted coefficients, the squares designating coefficients present at the particular instant shown in FIG. 6 or the particular instant shown in FIG. 7 have been characterized by hatched lines.

At this juncture, it may be noted that FIGS. 5 to 7 and 8 to 11 already represent special embodiments in which, relative to FIG. 4, coefficients of or above a given threshold significance have been selected for strategic updating, whereby only the selected coefficients (FIG. 5 or FIG. 8) are subjected to the selective updating process (FIGS. 6 and 7; or FIGS. 9 to 11). This is presently the most preferred embodiment. However, it is also within the scope of the subject invention to apply the selective updating process to the subcoefficient matrix (FIG. 4), rather than only to a selected fragment thereof (FIG. 5 or FIG. 8).

Moreover, while it is true that the coefficients 1a, 2a, 1b, 3c, etc., are not identical as among different subfields, they respectively correspond in terms of order.

Even though only a fraction of the further coefficients is transferred at any instant, the update of the first and selected further coefficient is done for each field. In other words, the coefficient 3d shown in FIG. 7 has been updated for the field to which FIG. 7 pertains and is thus not the same as the omitted coefficient 3d of FIG. 6. If information about each field is being transferred, then the update is done individually as to each field.

On the other hand, the coefficient selection stategy according to the subject invention and its preferred embodiments may be combined with a skip-field technique, in which case the updating would be done for each field being utilized in the transmission, recording or other transfer process.

This further distinguishes the subject invention from inter-frame encoding or frame-correction coding schemes in which picture element values are stored to be interrogated or transmitted in interlace passes (cf. p. 634 of the above mentioned PICTURE BANDWIDTH COMPRESSION book). The compression methods of the subject invention do not limit resolution and provide continuous update of motion data to eliminate the motion loss of previous systems.

In this respect, we may consider the following example of a method of the present invention employing a one dimensional orthogonal transform technique for video which converts, for example, 16 successive picture brightness value (pixels or pels) a b c ... p into a set of basis vectors in accordance with equation (1):

$$[a, b, c, \ldots p]T = A, B, C, \ldots P \qquad (1)$$

where a, b, c, ... = brightness values

T = orthogonal Transform matrix

A, B, C, ... = Transform basis vector weights

The basis vector A (corresponding, for instance, to 1a in FIG. 4) is the DC coefficient and represents the average brightness of picture elements a through p. This basis vector A is selected and transmitted every time the transform is taken.

The other basis vectors represent spatial content in the scene and, in accordance with the principles of the subject invention, are updated less frequently. A convenient update of spatial content information (motion) of approximately 20 Hz may be used in the NTSC system), i.e., one-third the frame transmission rate required to avoid visual flicker. The basis vectors which are stored or transmitted on each of three TV fields 1, 2 and 3 are presented below:

Field #1—A BCDEF
Field #2—A GHIJK
Field #3—A LMNOP

Thus, for any given field, only 6 out of a total of 16 transform coefficients are transmitted. A data compression ratio approximating three to one is thereby obtained.

Similarly, for an update of 30 Hz, i.e. one-half the frame transmission rate in the NTSC system, the basis vectors stored or transmitted on each of two TV fields 1 and 2 would be:

Field #1—A BDFHJLNP
Field #2—A CEGIKMO

A data compression ratio approximating two to one is thereby obtained.

In practice, it is not necessary to transform and update the synchronization information. Rather, as shown in FIG. 1, the synchronization information or sync signal may be separated from the video information, such as by the sync separator 23 whereby the video information, arranged in image fields and subfields, appears at the terminal 24 for forward transformation at 26, while the sync signal appears at the terminal 25 for control of the coefficient selector 28 and for recombination with the transformed and selectively updated first and further coefficients. A delay element 34 or similar equipment may be employed in the sync signal line 31 to compensate for delays of the video information in the transformation and coefficient selection processes, or otherwise to make sure that the sync signal is added to the processed video information to which it pertains.

The outputs of the coefficient selector 28 and the element 34 are connected to an adder 35 which combines the separated synchronization information and updated first and selected further coefficients to a reduced bandwidth video signal appearing at an output terminal 36 of the bandwidth compression apparatus or, in other words, of the bandwidth compression portion of the system 10.

The reduced bandwidth video signal, including the updated first and selected further coefficients and the synchronization information, is transferred through a data channel 14 connected to the terminal 36.

By way of example, the data channel 14 may be a data transmission link, such as a video transmission and reception facility. On the other hand, the data channel 14 may include a video tape recording and playback machine. In either case, the bandwidth compression techniques of the subject invention and its preferred embodiments permit use of a narrower bandwidth data channel than if the video and synchronization information were transmitted or transferred in a conventional form.

After transmission, playback or other transfer, the transferred reduced bandwidth video signal, including the transferred updated first and selected further coefficients and synchronization information, is applied via an input terminal 38 to a sync separator 39 which applies the transferred updated first and selected further coefficients to reverse transform and demultiplexer circuitry 41, and which applies the separated synchronization information to a sync signal line 42.

The reverse transform and demultiplexer circuitry 41 is driven by the synchronization information via line 42 and partially reconstructs the video information with the transferred updated first and selected further coefficients. Such reconstruction is herein called "partial" since, at least theoretically, some losses occur during encoding, transfer and decoding.

However, flicker in the reconstructed picture is avoided by updating the average subfield luminance coefficient 1a and a fraction of selected further coefficients for each frame being utilized. In addition, though the selected further coefficients, as shown above, are for bandwidth compression purposes updated less frequently, sufficient motion information for a reconstruction of moving scenes is reserved in view of the above mentioned lower repetition rate needed for creating the illusion of motion in the human observer.

The output signal of the reverse transform and demultiplexer circuitry 41, containing the video information partially reconstructed from the transferred reduced bandwidth video signal, or the transferred first and selected further transform coefficients or coefficient signals, is applied to an adder 40 which recombines the reconstructed video information with the sync signal proceeding via line 42. In this respect, it may be necessary to employ another delay line or similar equipment complementary to the delay element 34 used in the encoder portion of the system. However, occurring delays between the updated video information and the sync signal can be handled in either sync separator 23 and 39, as it is not absolutely necessary that the synchronization information appear in the data link 14 in exact time synchronization with the coefficients of the data to which it pertains.

The composite video signal including the synchronized reconstructed video information is applied to a television monitor or receiver, or to other video display equipment 13 for a display of the partially reconstructed video information to one or more viewers.

In terms of FIGS. 6 and 7, the circuitry 41 of the decoder 16 reverses the transformation of picture elements from the selected transform coefficients shown in FIG. 6 and, during the next field, from the selected transform coefficients shown in FIG. 7. Similarly, and with reference to FIGS. 9, 10 and 11, the circuitry 41 of the decoder 16 reverses the transformation of picture elements from the transferred selected first and further coefficients shown in FIGS. 9 to 11 as to each field.

Accordingly, the field rate is not diminished. Of course, it is possible to employ a skip-field technique in addition to the transformation-type bandwidth compression of the subject invention. However, even in that case an update of the first coefficient and of a fraction of the further coefficients takes place for every field being utilized.

Reference may now be had to FIG. 12 for further information on the data transfer process. In this respect, while FIG. 12 is concerned with recording, the showing of the data channel and its contents illustrated therein is also relevant to data transmission or other forms of data transfer.

In particular, FIG. 12 shows video tape recording equipment 44 including a tape drive 45 rotating a capstan 46 for advancing magnetic video recording tape 47 relative to a recording head 48 in a recording channel 49. A playback head 50 is also shown to indicate a facility for playing back recorded information from the channel 49. In practice, a recording/playback head may be used at 48.

Even though the expression "data channel", as well as the expression "recording channel," is herein used in the singular, it should be understood that the reduced bandwidth video signal may be recorded in several tracks or channels, and may be transmitted over several transmission channels. For instance, the reduced bandwidth video signal may be linearly and serially recorded in a boustrophedonic pattern of recording tracks extending in parallel to the edges of the recording tape 47. Of course, simultaneous recording in two or more parallel recording tracks, and transverse-scan or slant-track recording, are alternatives within the scope of the subject invention. However, the bandwidth compression techniques of the subject invention and its preferred embodiments frequently permit linear recording of video information in a single track at a time.

FIG. 12 further shows in the recording channel 49 a series of increments or bits bearing combined numbers and letters designating the first coefficients 1a for two corresponding subfields of different fields (such as the two fields of a field-interlaced frame).

Additional increments or bits 3a, 5a, 2b, etc., and 2a, 4a, 6a, 1e, etc., indicate the further coefficients updated according to FIG. 6 and the further coefficients updated according to FIG. 7, respectively.

As may be seen from FIG. 12, the required track length for recording the coefficients shown in the recording channel 49 is considerably smaller than if all the coefficients of each of the two subfields were recorded. In this respect, a first savings is realized by the elimination of less significant coefficients according to FIG. 5. A further savings according to the subject invention is realized by the selective updating strategy shown in FIGS. 6 and 7. A yet further savings is obtainable by the coefficient selection strategy shown in FIGS. 8 to 11.

In practice, it may be necessary to provide a storage facility 52 between the compressor output terminal 36 and recording facility 48 in order to enable the serial recording of coefficients shown in FIG. 12. This storage facility may include a shift register facility or a storage element array or matrix, or a storage tube device for storing any of the updated coefficient arrays prior to serial recording in the channel 49. A complementary storage facility (not shown) would then be employed upon playback of the linearly recorded information.

Figure 13:
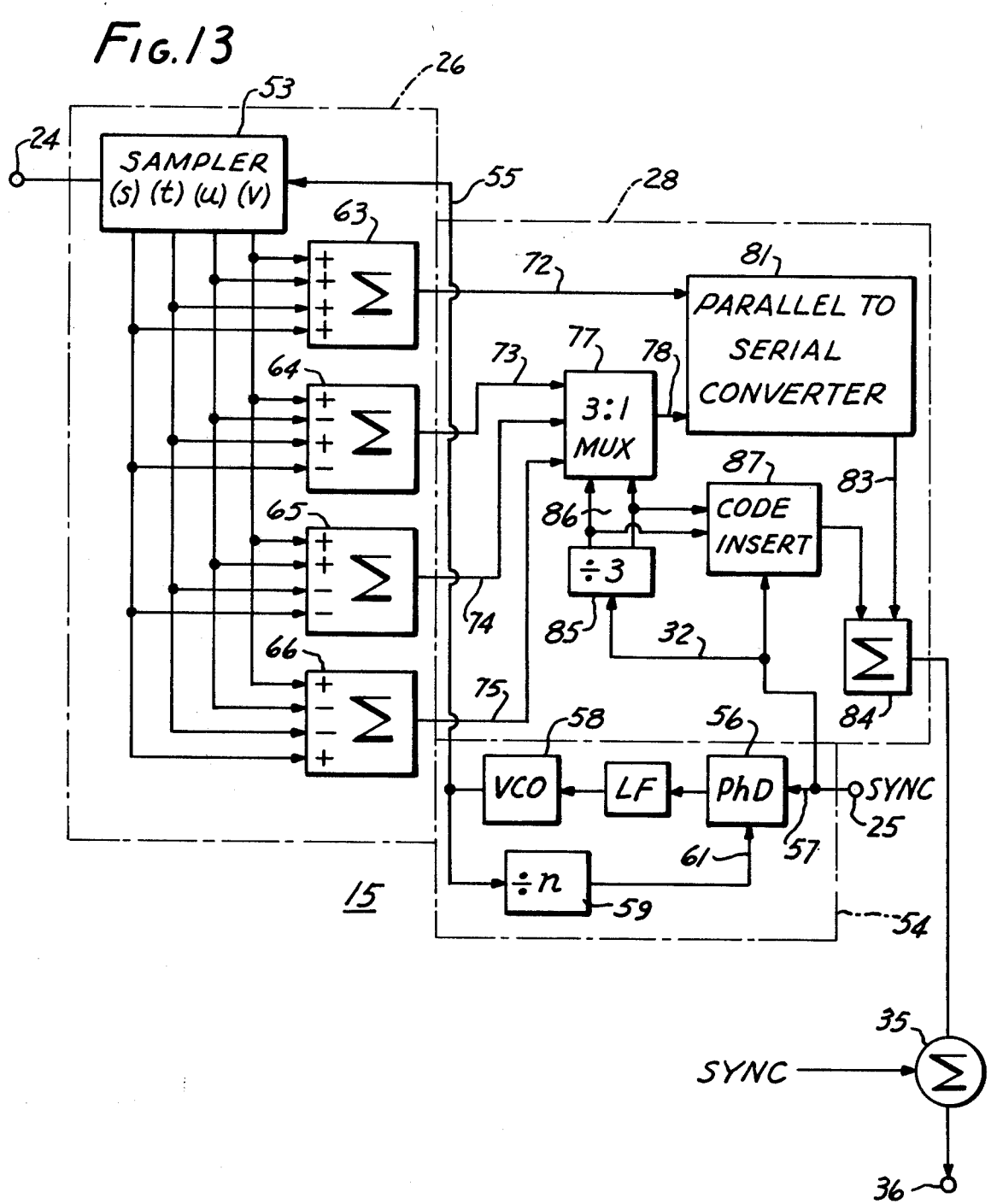
FIG. 13 is a block diagram of a bandwidth compression apparatus according to a preferred embodiment of the subject invention, as may be employed in the system of FIG. 1.

FIG. 13 shows forward transform circuitry 26 and associated coefficient selector circuitry 28 for the encoder 15. In particular, the transform circuitry 26 has a sampler 53 which receives the video information or luminance signal from the terminal 24 (see FIGS. 1 and 13).

The sampler 53 is driven by a phase-locked loop 54 which, in turn, is driven with synchronization information from the terminal 25 in order to provide a higher sampling frequency in a line 55.

The phase-locked loop 54 includes a phase detector 56 having a first input 57 for receiving the separated sync signal. The output of the phase detector 56 is applied through a loop filter to a voltage controlled oscillator 58 which applies its output signal to the line 55 and also to a frequency divider 59. The frequency divider 59, in turn, drives the second input 61 of the phase detector 66. In this manner, the frequency of the sampling signal in the line 55 is multiplied by a factor n relative to the frequency of the sync signal; with n being the divisor of the frequency divider 59.

By way of example, the sampling frequency in the line 55 may be 10.7 MHz.

In the embodiment shown in FIG. 13, the sampler resolves the video signal into four samples (s), (t), (u) and (v) at a time.

Suitable samplers are well known and include, for instance, a FET switch connected through a bus charging a capacitor (not shown). As to suitable switches, reference may be had to the RCA Solid State '74 DATA BOOK Series, pages 303 et seq., showing a COS/MOS Quad Bilateral Switch Type CD4066AD.

The four outputs of the sampler 53 are applied in parallel to four summers 63 to 66 which provide four transform coefficients of a Hadamard matrix. The sequency of the generated transform coefficients is indicated with the aid of positive and negative signs for each summer 63 to 66.

In particular, the sampler 53 and summers 63 to 66 implement a Hadamard matrix of the order of N=4, with the transform coefficient signal provided by the summer 63 in a line 72 having a sequency of 0. This corresponds to the average luminance of the sampled video signal as to the linear vector represented by the samples (s) to (v), which is in effect multiplied by the Hadamard matrix. The line 72 thus carries what has been termed above the "first coefficient" which is updated for each subfield or set of samples.

The summers 64, 65 and 66 provide in lines 73, 74 and 75 transform coefficient signals having sequencies of three, one and two, respectively. The lines 73 to 75 are applied to a 3:1 multiplexer 77 which effects a coefficient selection strategy by applying the transform coefficient signals occurring in lines 73 to 74 through a line 78 to a parallel to serial converter 81.

As to the simplified showing in FIG. 13 of an encoder 15, it will be recognized that each set of four samples (s) to (v) represents a subfield of which the summers 63 to 66 generate four transform coefficient signals, including a first coefficient signal in line 72 representing average luminance of the samples (s) to (v) of a particular set or linear vector. The transform coefficient signals in the lines 73 to 75, on the other hand, represent spatial content of the particular set of samples (s) to (v).

During a first set of samples (s) to (v) the line 72 applies a first coefficient indicative of average sample luminance to the parallel to serial converter 81, while the multiplexer 77 applies a further coefficient signal corresponding to the output of the summer 64 to the converter 81.

During a second set of samples (s) to (v) the line 72 applies a first coefficient signal indicative of average luminance of that second set to the converter 81, while the multiplexer 77 applies a different further coefficient signal corresponding to the output signal of the summer 65 to the converter 81.

During a third set of samples (s) to (v) the line 72 applies to the converter a first coefficient signal indicative of the average luminance of that third set of samples, while the multiplexer 77 applies to the converter 81 a yet further coefficient signal corresponding to the output signal of the summer 66.

The parallel-to-serial converter 81 applies the particular first and further coefficients seriatim via a line 83 to an adder 84.

In practice, the summers 63 to 66 may be composed of FET operational amplifiers of the type LHOO32 shown, for instance, in the Linear Integrated Circuits Data Book, by National Semiconductor Corporation, pp. 2–74 et seq. On the other hand, the above mentioned FET switches CD4066AD may be employed in the multiplexer 77 and converter 81.

The multiplexer 71 is driven by the sync signal via a divide-by-three component 85 and binary signal lines 86. The sync signal also drives a code inserter 87 which, through the adder 84, provides the bandwidth compressed video signal with a code identifying the updated further coefficients for demultiplexing on the decoder side. The encoded bandwidth compressed video signal is recombined with the sync signal at 35 and is applied to the terminal 36 for transmission, recording/playback or other transfer.

Figure 14:
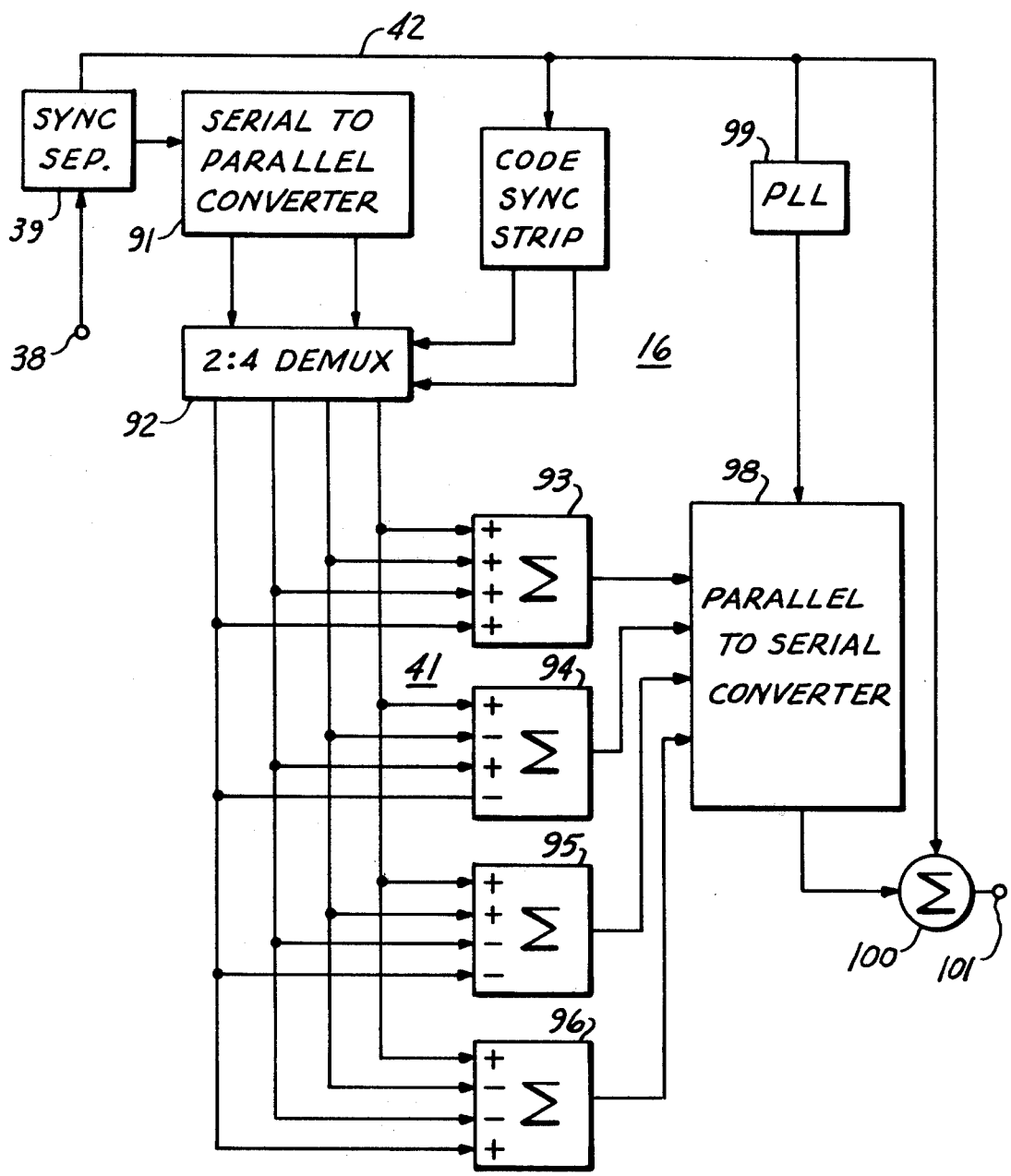
FIG. 14 is a block diagram of apparatus for restoring information from compressed bandwidth signal in accordance with a preferred embodiment of the subject invention, as may be employed in the system of FIG. 1 in conjunction with the apparatus of FIG. 13.

FIG. 14 shows a decoder 16 complementary to the encoder shown in FIG. 13.

In particular, the decoder 16 receives the transmitted, played-back or otherwise transferred video signal through the decoder input terminal 38. A sync separator 39 applies the sync signal with the coefficient identifier code to the line 42, and the separated video information to a serial-to-parallel converter 91.

The latter is complementary to the converter 81 shown in FIG. 13 and applies the first coefficient of each set of four samples (s) to (v) and the particular further coefficient (see 73, 74 or 75 in FIG. 13) to a 2:4 demultiplexer 92 for applying four outputs in parallel to four summers 93, 94, 95 and 96.

The summers 93 to 96 correspond to the summers 63 to 66 and may be of identical or similar construction. The summers 93 to 96 provide a parallel to serial converter 98 with four video signal values.

In this respect, it will be noted that the reverse transformation circuit 41 of FIG. 14 takes advantage of the fact that a multiplication of an orthogonal matrix and its inverse matrix ($M\ M^{-1}$) results in unity. For instance, a Hadamard transformation matrix M and its inverse matrix $M^{-1}$ represent adjoint transforms.

The converter 98 is driven by a phase-locked loop 99 which corresponds to the phase-locked loop 54 shown in FIG. 13. In this manner, the converter 98 reconstructs each set of samples (s) to (v) from the transmitted or transferred first and strategically updated further transform coefficient signals. An adder 100 recombines the video information and corresponding sync signal to a video signal which is applied to an output terminal 101.

Figure 15:
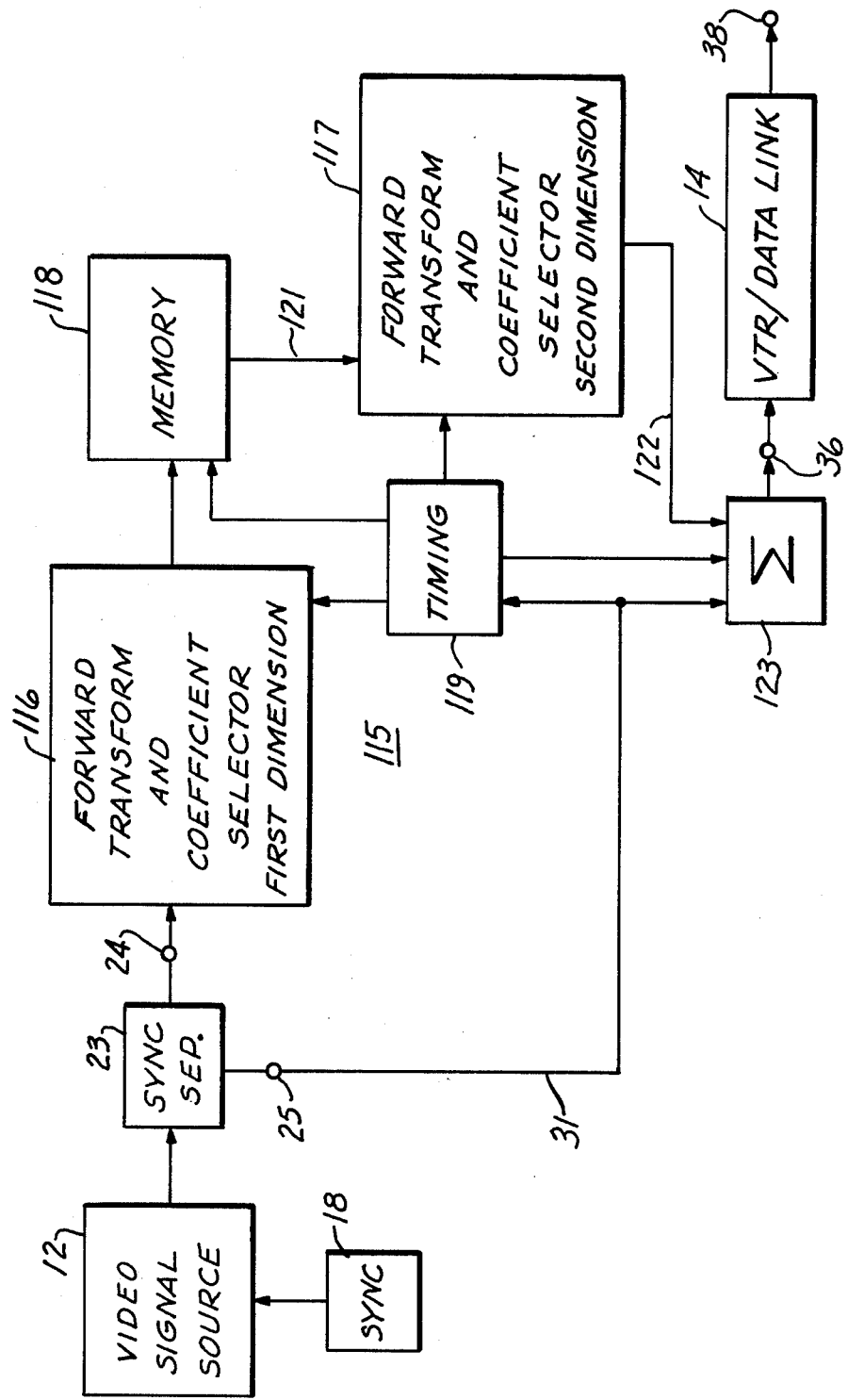
FIG. 15 is a block diagram of a bandwidth compression apparatus in accordance with a further preferred embodiment of the subject invention.

FIG. 15 is a block diagram of apparatus in accordance with a further preferred embodiment of the subject invention, for compressing the bandwidth of information in two dimensions, such as, by way of example, in the horizontal and vertical directions of video information.

By way of example, the apparatus of FIG. 15 may be an implementation of the system of FIG. 1 and, as there shwon, may employ a video signal source as the information source 12, driven by a sync signal source 18 for arranging the video information provided by the source 12 in image fields and subfields, with or without field interlace, as desired. Reference may, in this respect, be had to FIGS. 1, 2 et seq. and their description herein.

As in FIG. 1, the sync separator 23 separates the synchronization information from the video information, applying the video information to a terminal 24 and the synchronization information to a terminal 25.

The bandwidth compression apparatus of FIG. 15 has an encoder 115 which corresponds to the encoder 15 of the system of FIG. 1, having the forward transform component 26 and coefficient selector 28 broken down into a forward transform and coefficient selector component 116 for the first dimension and a forward transform and coefficient selector component 117 for the second dimension.

The system of FIG. 15 performs a corner turning operation with the aid of a memory 118. The operation of the components 116, 117 and 118 is controlled by a timing signal provided by a master clock or timing component 119 which is driven by the sync signal derived by the sync separator 23 and applied to the timing component via terminal 25 and line 31. The timing component 119 also supplies the encoded signal via an adder 123 with timing information for the decoding process.

A presently preferred operation of the apparatus of FIG. 15 will now be described with the aid of FIGS. 3 to 7.

In general, and with reference to FIG. 3, one of the components 116 and 117 of the apparatus of FIG. 15 may process rows of picture elements (pels or prixels) 22, and the other of these components 116 and 117 may process columns of pels 22. A coefficient selection strategy according to a preferred embodiment of the subject invention is advantageously effected in each dimension or, more specifically, in each of the transform function blocks 116 and 117. The memory 118 may, moreover, be employed to delete transform coefficient signals having less than a predetermined significance, as indicated in FIG. 5 relative to FIG. 4.

In the case of a field interlace system, the first-dimension forward transform and coefficient selector component 116 may, for instance, carry out the pel transform and coefficient selection function for the rows a through f shown in FIG. 6. The resulting coefficients are then stored in the memory 118.

Preferably, the component 115, in the case of video information, effects its forward transform and coefficient selector function line-by-line for each picture field or, in the case of a combination with a skip-field technique, for each field being utilized. The memory 118 stores the resulting transform coefficients, preferably in a line-by-line fashion in rows of memory elements.

If desired, a coefficient selection operation may be carried out in the memory 118. For instance, memory locations may be controlled to accept or to reject transform coefficient signal bits (note deleted coefficients in FIGS. 6 to 11). Alternatively or additionally, the transform coefficient signals deleted according to FIG. 5 for lack of an at least minimum given significance may be routinely deleted in the memory 118, inasmuch as these relatively insignificant coefficient signals have a recurring spatial position (e.g. lower right-hand corner in FIGS. 4 and 5).

Reverting to the basic operation of the system shown in FIG. 15, the memory 118 carries out what is customarily referred to as a "corner turning operation" or, briefly, a "corner turn". In practice, this may be implemented by reading into the memory 118 the first-dimension transform coefficients in a line-by-line or row fashion, and by reading out of the memory 118 these or selected ones of these transform coefficients in a columnar manner.

After having been subjected to a corner turn at 118, the selected first-dimension pel transform coefficients proceed via line 121 to the component 117 where they are subjected to the second-dimension forward transform and coefficient selection process.

As to the operation of the component 116 and of the component 117, reference may be had to FIG. 13 and its description herein contained. As to the result of the operation of the components 116, 117 and 118, reference may be had to the description of FIGS. 1 et seq.

In particular, the component 117 provides at its output 122, as a result of the above mentioned operation of the components 116, 117 and 118, a first transform coefficient signal (see 1a in FIG. 6) indicative of average luminance of the pels 22 of the particular subfield (see A-1 in FIG. 3) and a selected number of further transform coefficient signals (see 1c, 1e, 1f, 2b, 2d, 3a, 3c, 4b, 4c and 5a in FIG. 6) indicative of spatial content of the particular subfield and having been selected as mentioned above for their significance equal to or above a predetermined significance in terms of image reconstruction and in accordance with an updating strategy according to a preferred embodiment of the subject invention.

With reference to FIGS. 6 and 7, the apparatus of FIG. 15 updates the first coefficient signal 1a for each subfield (e.g. as to each of two interlaced fields for each frame), but updates the selected further coefficient signals 1b, 2a, etc. less frequently, as disclosed above.

The bandwidth compression apparatus of FIG. 15 includes a summing or adding component 123 which combines the two-dimensional coefficient signals with the sync signal derived via line 31 and the decoder timing information provided by the master clock 119.

The resulting composite signal appears at the output terminal 36, whence it is applied to the video tape recorder, data link or other data transfer channel or facility 14 for recording, transmission or other data transfer.

Figure 16:
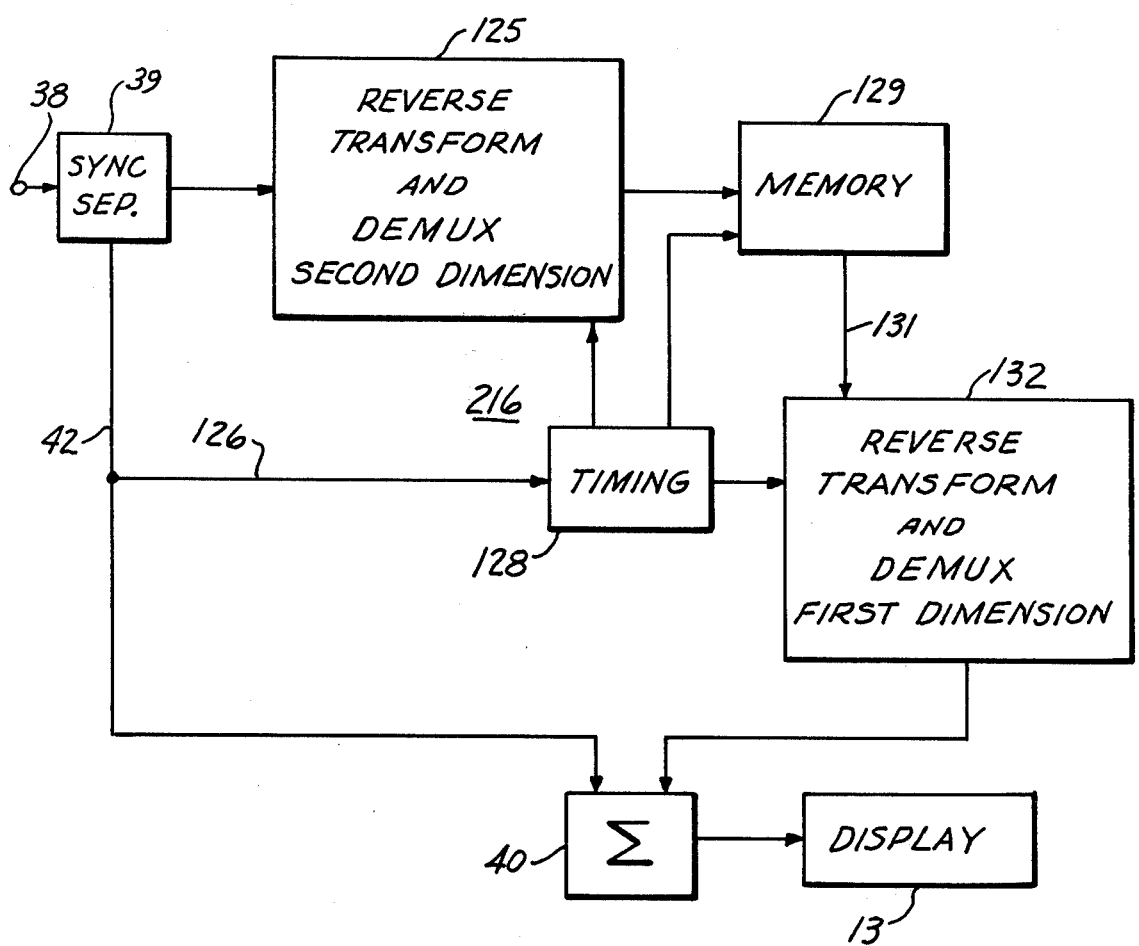
FIG. 16 is a block diagram of decoder apparatus operative in conjunction with the bandwidth compression apparatus of FIG. 15.

After playback, the recorded, transmitted or otherwise transferred composite output signal of the bandwidth compression apparatus of FIG. 15 appears at terminal means 38, whence it may be further applied to the decoder and signal restoration apparatus shown in FIG. 16.

In particular, the apparatus of FIG. 16 has a decoder 216 which corresponds to the decoder 16 shown in FIG. 1, and has a sync separator 39 which applies the played-back transmitted or otherwise transferred signal received at terminal 38 to reverse transform and demultiplexer circuitry 125, and which applies the separated synchronization information to the sync signal line 42.

The timing information contained in the signal received via terminal 38 is applied via a line 126 to a master clock or timing component 128 which corresponds to the timing component 119 of the apparatus of FIG. 15 and has an equivalent function in the apparatus of FIG. 16.

The reverse transform and demultiplexer circuitry 125 preferably corresponds to the forward transform and coefficient selector component 117 for the second dimension (see FIG. 15). The circuitry 125 thus reverses the second-dimension transform and coefficient selection process and applies the result of that transform reversal to a memory 129 which, corresponding to the memory 118 shown in FIG. 15, effects a corner turning operation or "corner turn" on the output of the circuitry 125.

Memory output lines 131 shown in FIG. 16 apply the corner turned coefficient signals to reverse transform and demultiplexer circuitry 132 which, corresponding preferably to the forward transform and coefficient selector component 116, reverses the first-dimension transform and coefficient selection process and applies the result of that transform reversal to the adder 40 for recombination with the previously separated sync signal.

As to the reverse transform and demultiplexer circuits 125 and 132, reference may be had to FIG. 14 and its verbal disclosure contained herein. In operational terms, the decoder 216 of FIG. 16 restores from such played-back coefficient signal patterns as the ones shown in FIGS. 6 and 7 the pels 22 illustrated in FIG. 3. Such restoration will again be "partial," since some recording/playback, transmission or other transfer losses can be expected in practice and less significant information may have been discarded.

As the remainder of the operation of the bandwidth compression system of FIGS. 15 and 16, and the display or other utilization of the at least partially reconstructed video information, reference may be had to FIGS. 1 to 14 and their description herein contained.

The subject extensive disclosure will render apparent or suggest to those skilled in the art various modifications and variations within the spirit and scope of the subject invention.

Without limiting the generality of this statement, it should be recognized that the principles and preferred embodiments of the subject invention, though largely described in terms of video signals, are not so limited, but lend themselves to application in other information recording/playback, transmission or transfer areas where bandwidth compression is desired. For instance, the invention and its preferred embodiments are applicable to the bandwidth compression not only of video signals, but also of other information of a recurring nature.

We claim:

1. A method of video information bandwidth compression, comprising in combination the steps of:

arranging said video information in image fields and subfields;

providing for said subfields a system of coefficients having a first coefficient indicative of average subfield luminance as to any given subfield and including a selected number of further coefficients indicative of spatial content of the particular subfield; and updating said first and further coefficients, with said first coefficient being updated for each subfield as to each utilized field and said further coefficients being updated less frequently than said first coefficient.

2. A method as claimed in claim 1, wherein:

said subfields are composed of picture elements;

picture elements of each subfield being utilized are transformed into a first transform coefficient signal indicative of average subfield luminance of the particular subfield and into further transform coefficient signals indicative of spatial content of the particular subfield; and said first transform coefficient signal is updated for each subfield being utilized and said further transform coefficient signals are updated less frequently than said first transform coefficient signal.

3. A method as claimed in claim 1, wherein:

said subfields are composed of picture elements;

picture elements of each subfield being utilized are transformed by orthogonal transformation into a first transform coefficient signal indicative of average subfield luminance of the particular subfield and into further transform coefficient signals indicative of spatial content of the particular subfield; and said first transform coefficient signal is updated for each subfield being utilized and said further transform coefficient signals are updated less frequently than said first transform coefficient signal.

4. A method as claimed in claim 1, wherein:

said subfields are composed of picture elements;

picture elements of each subfield being utilized are transformed by Hadamard orthogonal transformation into a first transform coefficient signal indicative of average subfield luminance of the particular subfield and into further transform coefficient signals indicative of spatial content of the particular subfield; and said first transform coefficient signal is updated for each subfield being utilized and said further transform coefficient signals are updated less frequently than said first transform coefficient signal.

5. A method as claimed in claim 1, wherein:

said updating of further coefficients is spread over n image fields, with n being an integer greater than one; and only 1/n further coefficients is updated during any image field.

6. A method as claimed in claim 5, wherein:

the further coefficients updated for any subfield during each set of n image fields are different from the further coefficients updated for any corresponding subfield during the same set of n image fields.

7. A method as claimed in claim 1, wherein:

said updating of further coefficients is spread over two image fields; and only one-half of said further coefficients is updated during any image field.

8. A method as claimed in claim 7, wherein:

the further coefficients updated for any subfield during each set of two image fields are different from the further coefficients updated for the corresponding subfield during the same set of two image fields.

9. A method as claimed in claim 1, wherein:

said updating of further coefficients is spread over three image fields; and only one-third of said further coefficients is updated during any image field.

10. A method as claimed in claim 9, wherein:

the further coefficients updated for any subfield during each set of three image fields are different from the further coefficients updated for any corresponding subfield among the same set of three image fields.

11. A method of video information bandwidth compression, comprising in combination the steps of:

arranging said video information in image fields and subfields;

providing for said subfields a system of coefficients having a first coefficient indicative of average subfield luminance as to any given subfield and including further coefficients indicative of spatial content of the particular subfield and being of unequal significance;

selecting from said further coefficients a number of coefficients having at least a predetermined significance and deleting the remainder of said further coefficients; and updating said first and selected further coefficients, with said first coefficient being updated for each subfield as to each utilized field and said selected further coefficients being updated less frequently than said first coefficient.

12. A method as claimed in claim 11, wherein:

said updating of selected further coefficients is spread over n image fields, with n being an integer greater than one; and only 1/n selected further coefficients is updated during any image field.

13. A method as claimed in claim 12, wherein:

the selected further coefficients updated for any subfield during each set of n image fields are different from the selected further coefficients updated for any corresponding subfield during the same set of n image fields.

14. A method as claimed in claim 11, wherein:

said subfields are composed of picture elements;

picture elements of each subfield being utilized are transformed into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals; and said first transform coefficient signal is updated for each subfield being utilized and said selected further transform coefficient signals are updated less frequently than said first transform coefficient signal.

15. A method as claimed in claim 11, wherein:

said subfields are composed of picture elements;

picture elements of each subfield being utilized are transformed by orthogonal transformation into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals; and said first transform coefficient signal is updated for each subfield being utilized and said selected further transform coefficient signals are updated less frequently than said first transform coefficient signal.

16. A method as claimed in claim 11, wherein:

said subfields are composed of picture elements;

picture elements of each subfield being utilized are transformed by Hadamard orthogonal transformation into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals; and said first transform coefficient signal is updated for each subfield being utilized and said selected further transform coefficient signals are updated less frequently than said first transform coefficient signal.

17. A method as claimed in claim 11, wherein:

said updating of selected further coefficients is spread over two image fields; and only one-half of said selected further coefficients is updated during any image field.

18. A method as claimed in claim 17, wherein:

the selected further coefficients updated for any subfield during each set of two image fields are different from the selected further coefficients updated for the corresponding subfield during the same set of two image fields.

19. A method as claimed in claim 11, wherein:

said updating of selected further coefficients is spread over three image fields; and only one-third of said selected further coefficients is updated during any image field.

20. A method as claimed in claim 19, wherein:

the selected further coefficients updated for any subfield during each set of three image fields are different from the selected further coefficients updated for any corresponding subfield among the same set of three image fields.

21. A method of compressing the bandwidth of a video signal including video information and synchronization information for said video information, comprising in combination the steps of:

separating said synchronization information from said video information;

arranging said video information in image fields and subfields;

providing for said subfields a system of coefficients having a first coefficient indicative of average subfield luminance as to any given subfield and including a selected number of further coefficients indicative of spatial content of the particular subfield;

updating said first and further coefficients, with said first coefficient being updated for each subfield as to each utilized field and said further coefficients being updated less frequently than said first coefficient; and combining said separated synchronization information and updated first and further coefficients to a reduced bandwidth video signal.

22. A method as claimed in claim 21, wherein:

said updating of further coefficients is spread over n image fields, with n being an integer greater than one;

only 1/n further coefficients is updated during any image field; and said separated synchronization information, said updated first coefficient and said 1/n further coefficients are combined to a reduced bandwidth video signal.

23. A method as claimed in claim 21, wherein:

said updating of further coefficients is spread over n image fields, with n being an integer greater than one;

only 1/n further coefficients is updated during any image field;

the further coefficients updated for any subfield during each set of n image fields are different from the further coefficients updated for any corresponding subfield during the same set of n image fields; and said separated synchronization information and the updated first and selected further coefficients for the subfields for which first and selected further coefficients have been updated are combined to a reduced bandwidth video signal.

24. A method as claimed in claim 21, wherein:

said updating of further coefficients is spread over two image fields;

only one-half of said further coefficients is updated during any image field; and said separated synchronization information, said updated first coefficient and said one-half of said further coefficients are combined to a reduced bandwidth video signal.

25. A method as claimed in claim 21, wherein:

said updating of further coefficients is spread over two image fields;

only one-half of said further coefficients is updated during any image field;

the further coefficients updated for any subfield during each set of two image fields are different from the further coefficients updated for the corresponding subfield during the same set of two image fields; and said separated synchronization information and the updated first and selected further coefficients for the subfields for which first and selected further coefficients have been updated are combined to a reduced bandwidth video signal.

26. A method as claimed in claim 21, wherein:

said updating of further coefficients is spread over three image fields;

only one-third of said further coefficients is updated during any image field; and said separated synchronization information, said updated first coefficient and said one-third of said further coefficients are combined to a reduced bandwidth video signal.

27. A method as claimed in claim 21, wherein:

said updating of further coefficients is spread over three image fields;

only one-third of said further coefficients is updated during any image field;

the further coefficients updated for any subfield during each set of three image fields are different from the further coefficients updated for any corresponding subfield among the same set of three image fields; and said separated synchronization information and the updated first and selected further coefficients for the subfields for which first and selected further coefficients have been updated are combined to a reduced bandwidth video signal.

28. A method as claimed in claim 21, wherein:

said subfields are composed of picture elements;

picture elements of each subfield being utilized are transformed into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal; and said separated synchronization information and updated first and further transform coefficient signals are combined to a reduced bandwidth video signal.

29. A method as claimed in claim 21, wherein:

said subfields are composed of picture elements;

picture elements of each subfield being utilized are transformed by orthogonal transformation into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal; and said separated synchronization information and updated first and further transform coefficient signals are combined to a reduced bandwidth video signal.

30. A method as claimed in claim 21, wherein:

said subfields are composed of picture elements;

picture elements of each subfield being utilized are transformed by Hadamard orthogonal transformation into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal; and said separated synchronization information and updated first and further transform coefficient signals are combined to a reduced bandwidth video signal.

31. A method of compressing the bandwidth of a video signal including video information and synchronization information for said video information, comprising in combination the steps of:

separating said synchronization information from said video information;

arranging said video information in image fields and subfields;

providing for said subfields a system of coefficients having a first coefficient indicative of average subfield luminance as to any given subfield and including further coefficients indicative of spatial content of the particular subfield and being of unequal significance;

selecting from said further coefficients a number of coefficients having at least a predetermined significance and deleting the remainder of said further coefficients;

updating said first and selected further coefficients, with said first coefficient being updated for each subfield as to each utilized field and said selected further coefficients being updated less frequently than said first coefficient; and combining said separated synchronization information and updated first and selected further coefficients to a reduced bandwidth video signal.

32. A method as claimed in claim 31, wherein:

said updating of selected further coefficients is spread over n image fields, with n being an integer greater than one;

only 1/n selected further coefficients is updated during any image field; and said separated synchronization information, said updated first coefficient and said 1/n selected further coefficients are combined to a reduced bandwidth video signal.

33. A method as claimed in claim 31, wherein:

said updating of selected further coefficients is spread over n image fields, with n being an integer greater than one;

only 1/n selected further coefficients is updated during any image field;

the selected further coefficients updated for any subfield during each set of n image fields are different from the selected further coefficients updated for any corresponding subfield during the same set of n image fields; and said separated synchronization information and the updated first and selected further coefficients for the subfields for which first and selected further coefficients have been updated are combined to a reduced bandwidth video signal.

34. A method as claimed in claim 31, wherein:

said updating of selected further coefficients is spread over two image fields;

only one-half of said selected further coefficients is updated during any image field; and said separated synchronization information, said updated first coefficient and said one-half of said selected further coefficients are combined to a reduced bandwidth video signal.

35. A method as claimed in claim 31, wherein:

said updating of selected further coefficients is spread over two image fields;

only one-half of said selected further coefficients is updated during any image field;

the selected further coefficients updated for any subfield during each set of two image fields are different from the selected further coefficients updated for the corresponding subfield during the same set of two image fields.

36. A method as claimed in claim 31, wherein:

said updating of selected further coefficients is spread over three image fields;

only one-third of said selected further coefficients is updated during any image field; and said separated synchronization information, said updated first coefficient and said one-third of said further coefficients are combined to a reduced bandwidth video signal.

37. A method as claimed in claim 31, wherein:

said updating of selected further coefficients is spread over three image fields;

only one-third of said selected further coefficients is updated during any image field;

the selected further coefficients updated for any subfield during each set of three image fields are different from the selected further coefficients updated for any corresponding subfield among the same set of three image fields.

38. A method as claimed in claim 31, wherein:

said subfields are composed of picture elements;

picture elements of each subfield being utilized are transformed into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals;

said first transform coefficient signal is updated for each subfield being utilized and said selected further transform coefficient signals are updated less frequently than said first transform coefficient signal; and said separated synchronization information and updated first and selected further transform coefficient signals are combined to a reduced bandwidth video signal.

39. A method as claimed in claim 31, wherein:

said subfields are composed of picture elements;

picture elements of each subfield being utilized are transformed by orthogonal transformation into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals;

said first transform coefficient signal is updated for each subfield being utilized and said selected further transform coefficient signals are updated less frequently than said first transform coefficient signal; and said separated synchronization information and updated first and selected further transform coefficient signals are combined to a reduced bandwidth video signal.

40. A method as claimed in claim 31, wherein:

said subfields are composed of picture elements;

picture elements of each subfield being utilized are transformed by Hadamard orthogonal transformation into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals;

said first transform coefficient signal is updated for each subfield being utilized and said selected further transform coefficient signals are updated less frequently than said first transform coefficient signal; and said separated synchronization information and updated first and selected further transform coefficient signals are combined to a reduced bandwidth video signal.

41. A method of compressed bandwidth video information processing, comprising in combination the steps of:

arranging said video information in image fields and subfields;

providing for said subfields a system of coefficients having a first coefficient indicative of average subfield luminance as to any given subfield and including a selected number of further coefficients indicative of spatial content of the particular subfield;

updating said first and further coefficients, with said first coefficient being updated for each subfield as to each utilized field and said further coefficients being updated less frequently than said first coefficient;

transferring said updated first and further coefficients through a data channel; and partially reconstructing said video information with said transferred updated first and further coefficients.

42. A method as claimed in claim 41, including the step of:

displaying said partially reconstructed video information.

43. A method as claimed in claim 41, wherein:

said updating of further coefficients is spread over n image fields, with n being an integer greater than one;

only 1/n further coefficients is updated during any image field; and said updated first coefficient and only said updated 1/n further coefficients are transferred through said data channel for any image field.

44. A method as claimed in claim 41, wherein:

said updating of further coefficients is spread over n image fields, with n being an integer greater than one;

only 1/n further coefficients is updated during any image field;

the further coefficients updated for any subfield during each set of n image fields are different from the further coefficients updated for any corresponding subfield during the same set of n image fields;

the updated first and further coefficients for the subfields for which first and further coefficients have been updated are transferred through said data channel; and said video information is partially reconstructed from said transferred first and further coefficients.

45. A method as claimed in claim 41, wherein:

said updating of further coefficients is spread over two image fields;

only one-half of said further coefficients is updated during any image field; and said updated first coefficient and only said updated one-half further coefficients are transferred through said data channel for any image field.

46. A method as claimed in claim 41, wherein:

said updating of further coefficients is spread over two image fields;

only one-half of said further coefficients is updated during any image field;

the further coefficients updated for any subfield during each set of two image fields are different from the further coefficients updated for the corresponding subfield during the same set of two image fields;

the updated first and further coefficients for the subfields for which first and further coefficients have been updated are transferred through said data channel; and said video information is partially reconstructed from said transferred first and further coefficients.

47. A method as claimed in claim 41, wherein:

said updating of further coefficients is spread over three image fields;

only one-third of said further coefficients is updated during any image field; and said updated first coefficient and only said updated one-third further coefficients are transferred through said data channel for any image field.

48. A method as claimed in claim 41, wherein:

said updating of further coefficients is spread over three image fields;

only one-third of said further coefficients is updated during any image field;

the further coefficients updated for any subfield during each set of three image fields are different from the further coefficients updated for any corresponding subfield among the same set of three image fields;

the updated first and further coefficients for the subfields for which first and further coefficients have been updated are transferred through said data channel; and said video information is partially reconstructed from said transferred first and further coefficients.

49. A method as claimed in claim 41, wherein:

said subfields are composed of picture elements;

picture elements of each subfield being utilized are transformed into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal;

said updated first and further transform coefficient signals are transferred through said data channel; and said video information is partially reconstructed from said transferred updated first and further transform coefficient signals.

50. A method as claimed in claim 41, wherein:

said subfields are composed of picture elements;

picture elements of each subfield being utilized are transformed by orthogonal transformation into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal;

said updated first and further transform coefficient signals are transferred through said data channel; and said video information is partially reconstructed from said transferred updated first and further transform coefficient signals.

51. A method as claimed in claim 41, wherein:

said subfields are composed of picture elements;

picture elements of each subfield being utilized are transformed by Hadamard orthogonal transformation into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal;

said updated first and further transform coefficient signals are transferred through said data channel; and said video information is partially reconstructed from said transferred updated first and further transform coefficient signals.

52. A method of compressed bandwidth video information processing, comprising in combination the steps of:

arranging said video information in image fields and subfields;

providing for said subfields a system of coefficients having a first coefficient indicative of average subfield luminance as to any given subfield and including further coefficients indicative of spatial content of the particular subfield and being of unequal significance;

selecting from said further coefficients a number of coefficients having at least a predetermined significance and deleting the remainder of said further coefficients;

updating said first and selected further coefficients, with said first coefficient being updated for each subfield as to each utilized field and said selected further coefficients being updated less frequently than said first coefficient;

transferring said updated first and selected further coefficients through a data channel; and partially reconstructing said video information with said transferred updated first and selected further coefficients.

53. A method as claimed in claim 52, including the step of:

displaying said partially reconstructed video information.

54. A method as claimed in claim 52, wherein:

said updating of selected further coefficients is spread over n image fields, with n being an integer greater than one;

only 1/n selected further coefficients is updated during any image field; and said updated first coefficient and only said updated 1/n selected further coefficients are transferred through said data channel for any image field.

55. A method as claimed in claim 52, wherein:

said updating of selected further coefficients is spread over n image fields, with n being an integer greater than one;

only 1/n selected further coefficients is updated during any image field;

the selected further coefficients updated for any subfield during each set of n image fields are different from the selected further coefficients updated for any corresponding subfield during the same set of n image fields;

the updated first and selected further coefficients for the subfields for which first and selected further coefficients have been updated are transferred through said data channel; and said video information is partially reconstructed from said transferred first and selected further coefficients.

56. A method as claimed in claim 52, wherein:

said updating of selected further coefficients is spread over two image fields;

only one-half of said selected further coefficients is updated during any image field; and said updated first coefficient and only said updated one-half further coefficients are transferred through said data channel for any image field.

57. A method as claimed in claim 52, wherein:

said updating of selected further coefficients is spread over two image fields;

only one-half of said selected further coefficients is updated during any image field;

the selected further coefficients updated for any subfield during each set of two image fields are different from the selected further coefficients updated for the corresponding subfield during the same set of two image fields;

the updated first and selected further coefficients for the subfields for which first and selected further coefficients have been updated are transferred through said data channel; and said video information is partially reconstructed from said transferred first and selected further coefficients.

58. A method as claimed in claim 52, wherein:

said updating of selected further coefficients is spread over three image fields;

only one-third of said selected further coefficients is updated during any image field; and said updated first coefficient and only said updated one-third selected further coefficients are transferred through said data channel for any image field.

59. A method as claimed in claim 52, wherein:

said updating of selected further coefficients is spread over three image fields;

only one-third of said selected further coefficients is updated during any image field;

the further coefficients updated for any subfield during each set of three image fields are different from the further coefficients updated for any corresponding subfield among the same set of three image fields;

the updated first and selected further coefficients for the subfields for which first and selected further coefficients have been updated are transferred through said data channel; and said video information is partially reconstructed from said transferred first and selected further coefficients.

60. A method as claimed in claim 52, wherein:

said subfields are composed of picture elements;

picture elements of each subfield being utilized are transformed into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals;

said first transform coefficient signal is updated for each subfield being utilized and said selected further transform coefficient signals are updated less frequently than said first transform coefficient signal;

said updated first and selected further transform coefficient signals are transferred through said data channel; and
said video information is partially reconstructed from said transferred updated and further transform coefficient signals.

61. A method as claimed in claim 52, wherein:
said subfields are composed of picture elements;
picture elements of each subfield being utilized are transformed by orthogonal transformation into a first transform coefficient signal indicative of average subfield luminance of the particular subfield and into further transform coefficient signals indicative of spatial content of the particular subfield;
a number of transform coefficient signals having at least a predetermined significance are selected from said further transform coefficient signals;
said first transform coefficient signal is updated for each subfield being utilized and said selected further transform coefficient signals are updated less frequently than said first transform coefficient signal;
said updated first and selected further transform coefficient signals are transferred through said data channel; and
said video information is partially reconstructed from said transferred updated first and further transform coefficient signals.

62. A method as claim in claim 52, wherein:
said subfields are composed of picture elements;
picture elements of each subfield being utilized are transformed by Hadamard orthogonal transformation into a first transfrom coefficient signal indicative of average subfield luminance of the particular subfield and into further transform coefficient signals indicative of spatial content of the particular subfield;
a number of transform coefficient signals having at least a predetermined significance are selected from said further transform coefficient signals;
said first transform coefficient signal is updated for each subfield being utilized and said selected further transform coefficient signals are updated less frequently than said first transform coefficient signal;
said updated first and selected further transform coefficient signals are transferred through said data channel; and
said video information is partially reconstructed from said transferred updated first and further transform coefficient signals.

63. A method of compressed bandwidth processing of a video signal including video information and synchronization information for said video information, comprising in combination the steps of:
separating said synchronization information from said video information;
arranging said video information in image fields and subfields;
providing for said subfields a system of coefficients having a first coefficient indicative of average subfield luminance as to any given subfield and including a selected number of further coefficients indicative of spatial content of the particular subfield;
updating said first and further coefficients, with said first coefficient being updated for each subfield as to each utilized field and said further coefficients being updated less frequently than said first coefficient;
combining said separated synchronization information and updated first and further coefficients to a reduced bandwidth video signal;
transferring said reduced bandwidth video signal through a data channel; and
partially reconstructing said video information with said transferred reduced bandwidth video signal.

64. A method as claimed in claim 63, including the step of:
displaying said partially reconstructed video information.

65. A method as claimed in claim 63, wherein:
said updating of further coefficients is spread over n image fields, with n being an integer greater than one;
only 1/n further coefficients is updated during any image field; and
said separated synchronization information, said updated first coefficient and said 1/n further coefficients are combined to a reduced bandwidth video signal.

66. A method as claimed in claim 63, wherein:
said updating of further coefficients is spread over n image fields, with n being an integer greater than one;
only 1/n further coefficients is updated during any image field;
the further coefficients updated for any subfield during each set of n image fields are different from the further coefficients updated for any corresponding subfield during the same set of n image fields; and
said separated synchronization information and the updated first and selected further coefficients for the subfields for which first and selected further coefficients have been updated are combined to a reduced bandwidth video signal.

67. A method as claimed in claim 63, wherein:
said updating of further coefficients is spread over two image fields;
only one-half of said further coefficients is updated during any image field; and
said separated synchronization information, said updated first coefficient and said one-half of said further coefficients are combined to a reduced bandwidth video signal.

68. A method as claimed in claim 63, wherein:
said updating of further coefficients is spread over two image fields;
only one-half of said further coefficients is updated during any image field;
the further coefficients updated for any subfield during each set of two image fields are different from the further coefficients updated for the corresponding subfield during the same set of two image fields; and
said separated synchronization information and the updated first and further coefficients for the subfields for which first and further coefficients have been updated are combined to a reduced bandwidth video signal.

69. A method as claimed in claim 63, wherein:
said updating of further coefficients is spread over three image fields;
only one-third of said further coefficients is updated during any image field; and
said separated synchronization information, said updated first coefficient and said one-third of said further coefficients are combined to a reduced bandwidth video signal.

70. A method as claimed in claim 63, wherein:
said updating of further coefficients is spread over three image fields;
only one-third of said further coefficients is updated during any image field;

the further coefficients updated for any subfield during each set of three image fields are different from the further coefficients updated for any corresponding subfield among the same set of three image fields; and said separated synchronization information and the updated first and further coefficients for the subfields for which first and further coefficients have been updated are combined to a reduced bandwidth video signal.

71. A method as claimed in claim 63, wherein:

said subfields are composed of picture elements;

picture elements of each subfield being utilized are transformed into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal; and said separated synchronization information and updated first and further transform coefficient signals are combined to a reduced bandwidth video signal.

72. A method as claimed in claim 63, wherein:

said subfields are composed of picture elements;

picture elements of each subfield being utilized are transformed by orthogonal transformation into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal; and said separated synchronization information and updated first and further transform coefficient signals are combined to a reduced bandwidth video signal.

73. A method as claimed in claim 63, wherein:

said subfields are composed of picture elements;

picture elements of each subfield being utilized are transformed by Hadamard orthogonal transformation into a first transform coefficient signal indicative of average subfield luminance of the particular subfield and into further transform coefficient signals indicative of spatial content of the particular subfield;

said first transform coefficient signal is updated for each subfield being utilized and said further transform coefficient signals are updated less frequently than said first transform coefficient signal; and said separated synchronization information and updated first and further transform coefficient signals are combined to a reduced bandwidth video signal.

74. A method of compressed bandwidth processing of a video signal including video information and synchronization information for said video information, comprising in combination the steps of:

separating said synchronization information from said video information;

arranging said video information in image fields and subfields;

providing for said subfields a system of coefficients having a first coefficient indicative of average subfield luminance as to any given subfield and including further coefficients indicative of spatial content of the particular subfield and being of unequal significance;

selecting from said further coefficients a number of coefficients having at least a predetermined significance and deleting the remainder of said further coefficients;

updating said first and selected further coefficients, with said first coefficient being updated for each subfield as to each utilized field and said selected further coefficients being updated less frequently than said first coefficient;

combining said separated synchronization information and updated first and selected further coefficients to a reduced bandwidth video signal;

transferring said reduced bandwidth video signal through a data channel; and partially reconstructing said video information with said transferred reduced bandwidth video signal.

75. A method as claimed in claim 74, including the step of:

displaying said partially reconstructed video information.

76. A method as claimed in claim 74, wherein:

said updating of selected further coefficients is spread over n image fields, with n being an integer greater than one;

only 1/n selected further coefficients is updated during any image field; and said separated synchronization information, said updated first coefficient and said 1/n selected further coefficients are combined to a reduced bandwidth video signal.

77. A method as claimed in claim 74, wherein:

said updating of selected further coefficients is spread over n image fields, with n being an integer greather than one;

only 1/n selected further coefficients is updated during any image field;

the selected coefficients updated for any subfield during each set of n image fields are different from the selected further coefficients updated for any corresponding subfield during the same set of n image fields;

the updated first and selected further coefficients for the subfields for which first and selected further coefficients have been updated are transferred through said data channel; and said video information is partially reconstructed from said transferred first and selected furhter coefficients.

78. A method as claimed in claim 74, wherein:

said updating of selected further coefficients is spread over two image fields;

only one-half of said selected further coefficients is updated during any image field; and said separated synchronization information, said updated first coefficient and said one-half of said selected further coefficients are combined to a reduced bandwidth video signal.

79. A method as claimed in claim 74, wherein:

said updating of selected further coefficients is spread over two image fields;

only one-half of said selected further coefficients is updated during any image field;

the selected further coefficients updated for any subfield during each set of two image fields are different from the selected further coefficients updated for the corresponding subfield during the same set of two image fields;

the updated first and selected further coefficients for the subfields for which first and selected further coefficients have been updated are transferred through said data channel; and said video information is partially reconstructed from said transferred first and selected further coefficients.

80. A method as claimed in claim 74, wherein:

said updating of selected further coefficients is spread over three image fields;

only one-third of said selected further coefficients is updated during any image field; and said separated synchronization information, said updated first coefficient and said one-third of said further coefficients are combined to a reduced bandwidth video signal.

81. A method as claimed in claim 74, wherein:

said updating of selected further coefficients is spread over three image fields;

only one-third of said selected further coefficients is updated during any image field;

the further coefficients updated for any subfield during each set of three image fields are different from the further coefficients updated for any corresponding subfield among the same set of three image fields;

the updated first and selected further coefficients for the subfields for which first and selected further coefficients have been updated are transferred through said data channel; and said video information is partially reconstructed from said transferred first and selected further coefficients.

82. A method as claimed in claim 74, wherein:

said subfields are composed of picture elements;

picture elements of each subfield being utilized are transformed into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals;

said first transform coefficient signal is updated for each subfield being utilized and said selected further transform coefficient signals are updated less frequently than said first transform coefficient signal; and said separated synchronization information and updated first and selected further transform coefficient signals are combined to a reduced bandwidth video signal.

83. A method as claimed in claim 74, wherein:

said subfields are composed of picture elements;

picture elements of each subfield being utilized are transformed by orthogonal transformation into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals;

said first transform coefficient signal is updated for each subfield being utilized and said selected further transform coefficient signals are updated less frequently than said first transform coefficient signal; and said separated synchronization information and updated first and selected further transform coefficient signals are combined to a reduced bandwidth video signal.

84. A method as claimed in claim 74, wherein:

said subfields are composed of picture elements;

picture elements of each subfield being utilized are transformed by Hadamard orthogonal transformation into a first transform coefficient signal indicative of average subfield luminance of the particular subfield and into further transform coefficient signals indicative of spatial content of the particular subfield;

a number of transform coefficient signals having at least a predetermined significance are selected from said further transform coefficient signals;

said first transform coefficient signal is updated for each subfield being utilized and said selected further transform coefficient signals are updated less frequently than said first transform coefficient signal; and said separated synchronization information and updated first and selected further transform coefficient signals are combined to a reduced bandwidth video signal.

85. A method of bandwidth compressing recurring information, comprising in combination the steps of:

arranging said recurring information in two-dimensional arrays of information elements;

providing for said arrays a system of coefficients having for each array a first coefficient indicative of an average intensity of information elements in the particular array and including a selected number of further coefficients indicative of spatial content in terms of the information elements of the particular array; and updating said first and further coefficients, with said first coefficient being updated more frequently than said further coefficients.

86. A method as claimed in claim 85, including the steps of:

transferring said updated first and further coefficients through a data channel.

87. A method as claimed in claim 85, including the steps of:

transferring said updated first and further coefficients through a data channel; and partially reconstructing said information from said transferred updated first and further coefficients.

88. A method as claimed in claim 85, wherein:

said updating of said further coefficients is spread over n arrays, with n being an integer greater than one;

only 1/n further coefficients is updated during any array; and said updated first coefficient and said updated 1/n further coefficients are transferred through a data channel.

89. A method as claimed in claim 85, wherein:

said updating of further coefficients is spread over n image fields, with n being an integer greater than one;

only 1/n of said further coefficients is updated during any array;

the further coefficients updated for any array during each set of n arrays are different from the further coefficients updated for any corresponding array during the same set of n arrays;

the updated first and further coefficients for the arrays for which first and further coefficients have been updated are transferred through a data channel; and said information is partially reconstructed from said transferred first and further coefficients.

90. In video information bandwidth compression apparatus, the improvement comprising in combination:

means for arranging said video information in image fields and subfields;

means operatively associated with said arranging means for providing for said subfields a system of coefficients having a first coefficient indicative of average subfield luminance as to any given subfield and including a selected number of further coefficients indicative of spatial content of the particular subfield; and means connected to said coefficients providing means for updating said first and further coefficients, said updating means including means for updating said first coefficient for each subfield as to each utilized field and for updating said further coefficients less frequently than said first coefficient.

91. An apparatus as claimed in claim 90, wherein:

said updating means include means for spreading the updating of further coefficients over n image fields, with n being an integer greater than one, and for updating only 1/n further coefficients during any image field.

92. An apparatus as claimed in claim 90, wherein:

said updating means include means for spreading the updating of further coefficients over n image fields, with n being an integer greater than one, and for updating during any image field only 1/n further coefficients which as to any subfield updated during each set of n image fields are different from the further coefficients updated for any corresponding subfield during the same set of n image fields.

93. An apparatus as claimed in claim 90, wherein:

said arranging means include means for arranging said video information in image fields and subfields composed of picture elements;

said means for providing a system of coefficients include means for transforming picture elements of each subfield being utilized into a first transform coefficient signal indicative of average subfield luminance of the particular subfield and into further transform coefficient signals indicative of spatial content of the particular subfield; and said updating means include means for updating said first transform coefficient signal for each subfield being utilized and for updating said further transform coefficient signals less frequently than said first transform coefficient signal.

94. In video information bandwidth compression apparatus, the improvement comprising in combination:

means for arranging said video information in image fields and subfields;

means operatively associated with said arranging means for providing for said subfields a system of coefficients having a first coefficient indicative of average subfield luminance as to any given subfield and including further coefficients indicative of spatial content of the particular subfield and being of unequal significance;

means connected to said coefficients providing means for selecting from said further coefficients a number of coefficients having at least a predetermined significance and for deleting the remainder of said further coefficients; and means connected to either of said coefficients providing means and said selecting means for updating said first and selected further coefficients, said updating means including means for updating said first coefficient for each subfield as to each utilized field and for updating said selected further coefficients less frequently than said first coefficient.

95. An apparatus as claimed in claim 94, wherein:

said updating means include means for spreading the updating of selected further coefficients over n image fields, with n being an integer greater than one, and for updating only 1/n selected further coefficients during any image field.

96. An apparatus as claimed in claim 94, wherein:

said updating means include means for spreading the updating of selected further coefficients over n image fields, with n being an integer greater than one, and for updating during any image field only 1/n selected further coefficients which as to any subfield updated during each set of n image fields are different from selected further coefficients updated for any corresponding subfield during the same set of n image fields.

97. A method as claimed in claim 94, wherein:

said arranging means include means for arranging said video information in image fields and subfields composed of picture elements;

said means for providing a system of coefficients include means for transforming picture elements of each subfield being utilized into a first transform coefficient signal indicative of average subfield luminance of the particular subfield and into further transform coefficient signals indicative of spatial content of the particular subfield, and means for selecting from said further transform coefficient signals a number of transform coefficient signals having at least a predetermined significance; and said updating means include means for updating said first transform coefficient signal for each subfield being utilized and for updating said selected further transform coefficient signals less frequently than said first transform coefficient signal.

98. In apparatus for compressing the bandwidth of a video signal including video information and synchronization information for said video information, the improvement comprising in combination:

means for separating said synchronization information from said video information;

means for arranging said video information in image fields and subfields;

means operatively associated with said separating means and arranging means for providing for said subfields a system of coefficients having a first coefficient indicative of average subfield luminance as to any given subfield and including a selected number of further coefficients indicative of spatial content of the particular subfield;

means connected to said coefficients providing means for updating said first and further coefficients, said updating means including means for updating said first coefficient for each subfield as to each utilized field and for updating said further coefficients less frequently than said first coefficient; and means connected to said updating means and to said separating means for combining said separated synchronization information and updated first and further coefficients to a reduced bandwidth video signal.

99. An apparatus as claimed in claim 98, wherein:

said updating means include means for spreading the updating of further coefficients over n image fields, with n being an integer greater than one, and for updating only 1/n further coefficients during any image field; and said combining means include means for combining said separated synchronization information, said updated first coefficient and said 1/n further coefficients to a reduced bandwidth video signal.

100. An apparatus as claimed in claim 98, wherein:

said updating means include means for spreading the updating of further coefficients over n image fields, with n being an integer greater than one, and for updating during any image field only 1/n further coefficients which as to any subfield updated during each set of n image fields are different from the further coefficients updated for any corresponding subfield during the same set of n image fields; and said combining means include means for combining said separated synchronization information, and updated first and further coefficients for the subfields for which first and further coefficients have been updated, to a reduced bandwidth video signal.

101. An apparatus as claimed in claim 98, wherein:

said arranging means include means for arranging said video information in image fields and subfields composed of picture elements;

said means for providing a system of coefficients include means for transforming picture elements of each subfield being utilized into a first transform coefficient signal indicative of average subfield luminance of the particular subfield and into further transform coefficient signals indicative of spatial content of the particular subfield;

said updating means include means for updating said first transform coefficient signal for each subfield being utilized and said further transform coefficient signals less frequently than said first transform coefficient signal; and said combining means include means for combining said separated synchronization information and updated first and further transform coefficient signals to a reduced bandwidth video signal.

102. In apparatus for compressing the bandwidth of a video signal including video information and synchronization information for said video information, the improvement comprising in combination:

means for separating said synchronization information from said video information;

means for arranging said video information in image fields and subfields;

means operatively associated with said separating means and arranging means for providing for said subfields a system of coefficients having a first coefficient indicative of average subfield luminance as to any given subfield and including further coefficients indicative of spatial content of the particular subfield and being of unequal significance;

means connected to said coefficients providing means for selecting from said further coefficients a number of coefficients having at least a predetermined significance and for deleting the remainder of said further coefficients;

means connected to either of said coefficients providing means and said selecting means for updating said first and selected further coefficients, said updating means including means for updating said first coefficient for each subfield as to each utilized field and for updating said selected further coefficients less frequently than said first coefficient; and means connected to said updating means and to said separating means for combining said separated synchronization information and updated first and selected further coefficients to a reduced bandwidth video signal.

103. An apparatus as claimed in claim 102, wherein:

said updating means include means for spreading the updating of selected further coefficients over n image fields, with n being an integer greater than one, and for updating only 1/n selected further coefficients during any image field; and said combining means include means for combining said separated synchronization information, said updated first coefficient and said 1/n selected further coefficients to a reduced bandwidth video signal.

104. An apparatus as claimed in claim 102, wherein:

said updating means include means for spreading the updating of selected further coefficients over n image fields, with n being an integer greater than one, and for updating during any image field only 1/n selected further coefficients which as to any subfield updated during each set of n image fields are different from selected further coefficients updated for any corresponding subfield during the same set of n image fields; and said combining means include means for combining said separated synchronization information, and updated first and selected further coefficients for the subfields for which first and selected further coefficients have been updated, to a reduced bandwidth video signal.

105. An apparatus as claimed in claim 102, wherein:

said arranging means include means for arranging said video information in image fields and subfields composed of picture elements;

said means for providing a system of coefficients include means for transforming picture elements of each subfield being utilized into a first transform coefficient signal indicative of average subfield luminance of the particular subfield and into further transform coefficient signals indicative of spatial content of the particular subfield, and means for selecting from said further transform coefficient signals a number of transform coefficient signals having at least a predetermined significance;

said updating means include means for updating said first transform coefficient signal for each subfield being utilized and for updating said selected further transform coefficient signals less frequently than said first transform coefficient signal; and said combining means include means for combining said separated synchronization information and updated first and selected further transform coefficient signals to a reduced bandwidth video signal.

106. In compressed bandwidth video information processing apparatus, the improvement comprising in combinaton:

means for arranging said video information in image fields and subfields;

means operatively associated with said arranging means for providing for said subfields a system of coefficients having a first coefficient indicative of average subfield luminance as to any given subfield and including a selected number of further coefficients indicative of spatial content of the particular subfield;

means connected to said coefficient providing means for updating said first and further coefficients, said updating means including means for updating said first coefficient for each subfield as to each utilized field and for updating said further coefficients less frequently than said first coefficient;

means including a data channel connected to said updating means for transferring said updated first and further coefficients; and means connected to said means including a data channel for partially reconstructing said video information from said transferred updated first and further coefficients.

107. An apparatus as claimed in claim 106, including:

means connected to said reconstructing means for displaying said partially reconstructed video information.

108. An apparatus as claimed in claim 106, wherein:
said updating means include means for spreading the updating of further coefficients over n image fields, with n being an integer greater than one, and for updating only 1/n further coefficients during any image field; and
said transferring means include means for transferring through said data channel said updated first coefficient and only said updated 1/n further coefficients during any image field.

109. An apparatus as claimed in claim 106, wherein:
said updating means include means for spreading the updating of further coefficients over n image fields, with n being an integer greater than one, and for updating during any image field only 1/n further coefficients which as to any subfield updated during each set of n image fields are different from the further coefficients updated for any corresponding subfield during the same set of n image fields;
said transferring means include means for transferring through said data channel the updated first and further coefficients for the subfields for which first and further coefficients have been updated.

110. A method as claimed in claim 106, wherein:
said arranging means include means for arranging said video information in image fields and subfields composed of picture elements;
said means for providing a system of coefficients include means for transforming picture elements of each subfield being utilized into a first transform coefficient signal indicative of average subfield luminance of the particular subfield and into further transform coefficient signals indicative of spatial content of the particular subfield;
said updating means include means for updating said first transform coefficient signal for each subfield being utilized and for updating said further transform coefficient signals less frequently than said first transform coefficient signal;
said transferring means include means for transferring said updated first and further transform coefficient signals through said data channel; and
said reconstructing means include means for partially reconstructing said video information from said transferred updated first and further transform coefficient signals.

111. In compressed bandwidth video information processing apparatus, the improvement comprising in combination:
means for arranging said video information in image fields and subfields;
means operatively associated with said arranging means for providing for said subfields a system of coefficients having a first coefficient indicative of average subfield luminance as to any given subfield and including further coefficients indicative of spatial content of the particular subfield and being of unequal significance;
means connected to said coefficients providing means for selecting from said further coefficients a number of coefficients having at least a predetermined significance and for deleting the remainder of said further coefficients;
means connected to either of said coefficients providing means and said selecting means for updating said first and selected further coefficients, said updating means including means for updating said first coefficient for each subfield as to each utilized field and for updating said selected further coefficients less frequently than said first coefficient;
means including a data channel connected to said updating means for transferring said updated first and selected further coefficients; and
means connected to said means including a data channel for partially reconstructing said video information from said transferred updated first and selected further coefficients.

112. An apparatus as claimed in claim 111, including:
means connected to said reconstructing means for displaying said partially reconstructed video information.

113. An apparatus as claimed in claim 111, wherein:
said updating means include means for spreading the updating of selected further coefficients over n image fields, with n being an integer greater than one, and for updating only 1/n selected further coefficients during any image field; and
said transferring means include means for transferring through said data channel said updated first coefficient and only said 1/n selected further coefficients during any image field.

114. An apparatus as claimed in claim 111, wherein:
said updating means include means for spreading the updating of selected further coefficients over n image fields, with n being an integer greater than one, and for updating during any image field only 1/n selected further coefficients which as to any subfield updated during each set of n image fields are different from selected further coefficients updated for any corresponding subfield during the same set of n image fields; and
said transferring means include means for transferring through said data channel the updated first and selected further coefficients for the subfields for which first and selected further coefficients have been updated.

115. A method as claimed in claim 111, wherein:
said arranging means include means for arranging said video information in image fields and subfields composed of picture elements;
said means for providing a system of coefficients include means for transforming picture elements of each subfield being utilized into a first transform coefficient signal indicative of average subfield luminance of the particular subfield and into further transform coefficient signal indicative of spatial content of the particular subfield, and means for selecting from said further transform coefficient signals a number of transform coefficient signals having at least a predetermined significance;
said updating means include means for updating said first transform coefficient signal for each subfield being utilized and for updating said selected further transform coefficient signals less frequently than said first transform coefficient signal;
said transferring means include means for transferring said updated first and selected further transfer coefficient signals through said data channel; and
said reconstructing means include means for partially reconstructing said video information from said transferred updated first and selected further transform coefficient signals.

116. In apparatus for compressed bandwidth processing of a video signal including video information and synchronization information for said video information, comprising in combination the steps of:

means for separating said synchronization information from said video information;

means for arranging said video information in image fields and subfields;

means operatively associated with said separating means and arranging means for providing for said subfields a system of coefficients having a first coefficient indicative of average subfield luminance as to any given subfield and including a selected number of further coefficients indicative of spatial content of the particular subfield;

means connected to said coefficients providing means for updating said first and further coefficients, said updating means including means for updating said first coefficient for each subfield as to each utilized field and for updating said further coefficients less frequently than said first coefficient;

means connected to said updating means and to said separating means for combining said separated synchronization information and updated first and further coefficients to a reduced bandwidth video signal;

means including a data channel connected to said combining means for transferring said reduced bandwidth video signal; and means connected to said means including a data channel for partially reconstructing said video information from said transferred reduced bandwidth video signal.

117. An apparatus as claimed in claim 116, including:

means connected to said reconstructing means for displaying said partially reconstructed video information.

118. An apparatus as claimed in claim 116, wherein:

said updating means include means for spreading the updating of further coefficients over n image fields, with n being an integer greater than one, and for updating only 1/n further coefficients during any image field;

said combining means include means for combining said separated synchronization information, said updated first coefficient and said 1/n further coefficients to a reduced bandwidth video signal; and said transferring means include means for transferring the latter reduced bandwidth video signal through said data channel.

119. An apparatus as claimed in claim 116, wherein:

said updating means include means for spreading the updating of further coefficients over n image fields, with n being an integer greater than one, and for updating during any image field only 1/n further coefficients which as to any subfield updated during each set of n image fields are different from the further coefficients updated for any corresponding subfield during the same set of n image fields;

said combining means include means for combining said separated synchronization information, and updated first and further coefficients for the subfields for which first and further coefficients have been updated, to a reduced bandwidth video signal; and said transferring means include means for transferring the latter reduced bandwidth video signal through said data channel.

120. An apparatus as claimed in claim 116, wherein:

said arranging means include means for arranging said video information in image fields and subfields composed of picture elements;

said means for providing a system of coefficients include means for transforming picture elements of each subfield being utilized into a first transform coefficient signal indicative of average subfield luminance of the particular subfield and into further transform coefficient signals indicative of spatial content of the particular subfield;

said updating means include means for updating said first transform coefficient signal for each subfield being utilized and said further transform coefficient signals less frequently than said first transform coefficient signal;

said combining means include means for combining said separated synchronization information and updated first and further transform coefficient signals to a reduced bandwidth video signal; and said transferring means include means for transferring the latter reduced bandwidth video signal through said data channel.

121. In apparatus for compressed bandwidth processing of a video signal including video information and synchronization information for said video information, the improvement comprising in combination:

means for separating said synchronization information from said video information;

means for arranging said video information in image fields and subfields;

means operatively associated with said separating means and arranging means for providing for said subfields a system of coefficients having a first coefficient indicative of average subfield luminance as to any given subfield and including further coefficients indicative of spatial content of the particular subfield and being of unequal significance;

means connected to said coefficients providing means for selecting from said further coefficients a number of coefficients having at least a predetermined significance and for deleting the remainder of said further coefficients;

means connected to either of said coefficients providing means and said selecting means for updating said first and selected further coefficients, said updating means including means for updating said first coefficient for each subfield as to each utilized field and for updating said selected further coefficients less frequently than said first coefficient;

means connected to said updating means and to said separating means for combining said separated synchronization information and updated first and selected further coefficients to a reduced bandwidth video signal;

means including a data channel connected to said combining means for transferring said reduced bandwidth video signal; and means connected to said means including a data channel for partially reconstructing said video information from said transferred reduced bandwidth video signal.

122. An apparatus as claimed in claim 121, including:

means connected to said reconstructing means for displaying said partially reconstructed video information.

123. An apparatus as claimed in claim 121, wherein:

said updating means include means for spreading the updating of selected further coefficients over n image fields, with n being an integer greater than one, and for updating only 1/n selected further coefficients during any image field;

said combining means include means for combining said separated synchronization information, said updated first coefficient and said 1/n selected further coefficients to a reduced bandwidth video signal; and said transferring means include means for transferring the latter reduced bandwidth video signal through said data channel.

124. An apparatus as claimed in claim 121, wherein:

said updating means include means for spreading the updating of selected further coefficients over n image fields, with n being an integer greater than one, and for updating during any image field only 1/n selected further coefficients which as to any subfield updated during each set of n image fields are different from selected further coefficients updated for any corresponding subfield during the same set of n image fields;

said combining means include means for combining said separated synchronization information, and updated first and selected further coefficients for the subfields for which first and selected further coefficients have been updated, to a reduced bandwidth video signal; and said transferring means include means for transferring the latter reduced bandwidth video signal through said data channel.

125. An apparatus as claimed in claim 121, wherein:

said arranging means include means for arranging said video information in image fields and subfields composed of picture elements;

said means for providing a system of coefficients include means for transforming picture elements of each subfield being utilized into a first transform coefficient signal indicative of average subfield luminance of the particular subfield and into further transform coefficient signals indicative of spatial content of the particular subfield, and means for selecting from said further transform coefficient signals a number of transform coefficient signals having at least a predetermined significance;

said updating means include means for updating said first transform coefficient signal for each subfield being utilized and for updating said selected further transform coefficient signals less frequently than said first transform coefficient signal;

said combining means include means for combining said separated synchronization information and updated first and selected further transform coefficient signals to a reduced bandwidth video signal; and said transferring means include means for transferring the latter reduced bandwidth video signal through said data channel.

126. In apparatus for compressing the bandwidth of recurring information, the improvement comprising in combination:

means for arranging said recurring information in two-dimensional arrays of information elements;

means operatively associated with said arranging means for providing for said arrays a system of coefficients having for each array a first coefficient indicative of an average intensity of information elements in the particular array and including a selected number of further coefficients indicative of spatial content in terms of the information elements of the particular array; and means connected to said coefficients providing means for updating said first and further coefficients, said updating means including means for updating said first coefficient more frequently than said first coefficient.

127. An apparatus as claimed in claim 126, including:

means including a data channel connected to said updating means for transferring said updated first and further coefficients.

128. An apparatus as claimed in claim 126, including:

means including a data channel connected to said updating means for transferring said updated first and further coefficients; and means connected to said means including a data channel for partially reconstructing said information from said transferred first and further coefficients.

129. An apparatus as claimed in claim 126, wherein:

said updating means include means for spreading the updating of said further coefficients over n arrays, with n being an integer greater than one, and for updating only 1/n further coefficients during any array; and said apparatus includes means including a data channel connected to said updating means for transferring said updated first coefficient and said updated 1/n further coefficients.

130. An apparatus as claimed in claim 126, wherein:

said updating means include means for spreading the updating of said further coefficients over n arrays, with n being an integer greater than one, for updating during any array only 1/n further coefficients which as to any array undated during each set of n arrays are different from the further coefficients updated for any corresponding array during the same set of n arrays;

means including a data channel connected to said updating means for transferring the updated first and further coefficients for the arrays for which first and further coefficients have been updated; and means connected to said means including a data channel for partially reconstructing said information from said transferred first and further coefficients.

* * * * *